United States Patent
Kamoshida

(10) Patent No.: US 11,148,503 B2
(45) Date of Patent: Oct. 19, 2021

(54) EVAPORATOR WITH COOL STORAGE FUNCTION

(71) Applicant: MAHLE Behr Thermal Systems (Japan) Company Limited, Oyama (JP)

(72) Inventor: Osamu Kamoshida, Oyama (JP)

(73) Assignee: MAHLE Behr Thermal Systems (Japan) Company Limited, Oyama (JP)

(*) Notice: Subject to any disclaimer, the term of this patent is extended or adjusted under 35 U.S.C. 154(b) by 141 days.

(21) Appl. No.: 15/836,917

(22) Filed: Dec. 11, 2017

(65) Prior Publication Data

US 2018/0162189 A1    Jun. 14, 2018

(30) Foreign Application Priority Data

Dec. 14, 2016  (JP) .............................. JP2016-242074
Sep. 28, 2017  (JP) .............................. JP2017-187335

(51) Int. Cl.
*B60H 1/00*    (2006.01)
*B60H 1/32*    (2006.01)
(Continued)

(52) U.S. Cl.
CPC ......... *B60H 1/005* (2013.01); *B60H 1/00335* (2013.01); *F28D 1/05391* (2013.01);
(Continued)

(58) Field of Classification Search
CPC .. B60H 1/005; B60H 1/00335; B60H 1/3233; B60H 1/3227; F28D 1/05391;
(Continued)

(56) References Cited

U.S. PATENT DOCUMENTS 4,124,018 A * 11/1978 Murray ..................... F28F 3/14
                                                    126/585
8,683,820 B2 * 4/2014 Lee ....................... F25D 17/067
                                                    62/288
(Continued)

FOREIGN PATENT DOCUMENTS

JP    63-32296      2/1988
JP    2524982 B2 *  8/1996  ......... F28D 1/05341
(Continued)

OTHER PUBLICATIONS

Japanese Office Action for corresponding JP Application No. 2017-187335, dated Jun. 1, 2021 (w/ English machine translation).

*Primary Examiner* — Eric S Ruppert
*Assistant Examiner* — Kirstin U Oswald
(74) *Attorney, Agent, or Firm* — Mori & Ward, LLP

(57) ABSTRACT

An evaporator with a cool storage function includes a first refrigerant flow tube, a second refrigerant flow tube, a cold storage material container, and a heat conductor. The cold storage material container is provided between the first refrigerant flow tube and the second refrigerant flow tube. The heat conductor is provided in the cold storage material container. The heat conductor includes a base plate, first projections, and second projections. The base plate is apart from a first container wall and a second container wall of the cold storage material container. The first projections project from the base plate toward the first container wall to contact the first container wall. The second projections project from the base plate toward the second container wall to contact the second container wall.

13 Claims, 16 Drawing Sheets

(51) Int. Cl.
*F28D 20/02* (2006.01)
*F28D 1/053* (2006.01)
F28D 20/00 (2006.01)
F28D 21/00 (2006.01)

(52) U.S. Cl.
CPC ...... *F28D 20/02* (2013.01); *F28D 2020/0013* (2013.01); *F28D 2021/0085* (2013.01)

(58) Field of Classification Search
CPC ............. F28D 20/02; F28D 2021/0085; F28D 2020/0013; Y02E 60/14
USPC .......................................................... 62/285
See application file for complete search history.

(56) References Cited

U.S. PATENT DOCUMENTS

| | | | | |
|---|---|---|---|---|
| 2003/0097852 A1* | 5/2003 | Tomita | ................... | B60H 1/005 62/244 |
| 2003/0233835 A1* | 12/2003 | Tomita | ................ | B60H 1/3208 62/133 |
| 2004/0104020 A1* | 6/2004 | Haller | ................... | F28D 7/0008 165/177 |
| 2006/0196632 A1* | 9/2006 | Kudo | ..................... | F28D 20/02 165/10 |
| 2006/0288727 A1* | 12/2006 | Aikawa | .................. | F25D 16/00 62/434 |
| 2007/0039714 A1* | 2/2007 | Loup | .................... | F28F 9/0204 165/43 |
| 2009/0007593 A1* | 1/2009 | Kerler | ................... | B60H 1/005 62/515 |
| 2009/0025419 A1* | 1/2009 | Kerler | ................. | F28D 1/05391 62/524 |
| 2009/0095015 A1* | 4/2009 | Kerler | ................. | F28D 1/05391 62/524 |
| 2010/0018231 A1* | 1/2010 | Haller | ................... | F28D 1/0535 62/238.6 |
| 2010/0307180 A1* | 12/2010 | Yamada | .................... | F28F 1/10 62/285 |
| 2011/0239696 A1* | 10/2011 | Takagi | ................... | B60H 1/005 62/524 |
| 2012/0042687 A1* | 2/2012 | Kamoshida | ............ | F28D 20/02 62/524 |
| 2012/0204597 A1* | 8/2012 | Karl | ....... | F28F 3/025 62/529 |
| 2013/0067946 A1* | 3/2013 | Higashiyama | ......... | F25B 39/02 62/288 |
| 2013/0086938 A1* | 4/2013 | Higashiyama | ......... | F28D 20/02 62/524 |
| 2013/0212881 A1 | 8/2013 | Kamoshida et al. | | |
| 2014/0165647 A1* | 6/2014 | Hirayama | ............. | F25B 39/022 62/515 |
| 2014/0174121 A1* | 6/2014 | Hirayama | ............. | F28D 1/0333 62/524 |
| 2015/0198383 A1* | 7/2015 | Kitoh | ..................... | F28D 20/02 165/10 |
| 2016/0347146 A1* | 12/2016 | Wijaya | ............... | B60H 1/00335 |

FOREIGN PATENT DOCUMENTS

| | | | | |
|---|---|---|---|---|
| JP | 2013-170730 | | 9/2013 | |
| JP | 2013170730 A | * | 9/2013 | ............. B23P 15/26 |
| JP | 2014-124971 | | 7/2014 | |
| JP | 2014124971 A | * | 7/2014 | ........... F25B 39/022 |
| WO | WO-2013125533 A1 | * | 8/2013 | ......... F28D 1/05341 |

\* cited by examiner

EVAPORATOR WITH COOL STORAGE FUNCTION

CROSS-REFERENCE TO RELATED APPLICATIONS

The present application claims priority under 35 U.S.C. § 119 to Japanese Patent Application No. 2016-242074, filed Dec. 14, 2016, entitled "Evaporator With Cool Storage Function" and Japanese Patent Application No. 2017-187335, filed Sep. 28, 2017, entitled "Evaporator With Cool Storage Function." The contents of these applications are incorporated herein by reference in their entirety.

BACKGROUND

Field of the Invention

The present invention relates to an evaporator with a cool storage function.

Discussion of the Background

In recent years, for the purpose of environmental conservation and an improvement of fuel efficiency of automobiles, there has been proposed an automobile that automatically stops its engine when the automobile stops while waiting at the traffic light and the like.

In a typical car air-conditioner, when the engine stops, a compressor that uses the engine as a driving source also stops. This leads to a problem that supply of a refrigerant to an evaporator stops, and cooling capability quickly drops.

Thus, in order to address such a problem, there has been proposed an evaporator of various types with a cold storage function, which evaporator capable of storing cold energy when a compressor is working, and of releasing the stored cold energy when an engine, and thus the compressor, stops.

The present applicant has also proposed previously an evaporator with a cool storage function provided with: a plurality of flat-shaped refrigerant flow tubes each positioned with its longitudinal direction along a top-bottom direction and its width direction along a front-back direction; a cold storage material container in which a cold storage material is enclosed and an inner fin is disposed; and a heat exchanger core unit having an outer fin, wherein in the heat exchanger core unit, a plurality of tube pairs are arranged in a right-left direction with a space between each other, each of the tube pairs including two of the refrigerant flow tubes that are positioned in the front-back direction with a space therebetween, and thus a gap is provided between tube pairs adjacent in the right-left direction, the cold storage material container is positioned so as to be brought into contact with a part and more than one of all of the gaps across the two refrigerant flow tubes of the tube pair, the outer fin is positioned so as to be brought into contact with a remaining part and more than one of the all of the gaps across the two refrigerant flow tubes of the tube pair, and the inner fin disposed within the cold storage material container includes a wave top part extending along the top-bottom direction, a wave bottom part extending along the top-bottom direction, and a connecting part connecting the wave top part and the wave bottom part (cf., Japanese Unexamined Patent Application Publication No. 2014-124971).

A first inner fin used in the evaporator with a cool storage function described in Japanese Unexamined Patent Application Publication No. 2014-124971 is in an offset-shape, in which a plurality of wave-shaped band plates each having a wave top part extending in the top-bottom direction, a wave bottom part extending in the top-bottom direction, and a connecting part connecting the wave top part and the wave bottom part are arranged in the top-bottom direction and integrally coupled each other, the wave top parts, as well as the wave bottom parts, of two wave-shaped band plates that are adjacent in the top-bottom direction are displaced in the front-back direction. Further, a second inner fin used in the evaporator with a cool storage function described in Japanese Unexamined Patent Application Publication No. 2014-124971 is in a corrugated shape, having a wave top part extending in the top-bottom direction, a wave bottom part extending in the top-bottom direction, and a connecting part coupling the wave top part and the wave bottom part, and the connecting part is provided with a through hole.

According to the evaporator with a cool storage function described in Japanese Unexamined Patent Application Publication No. 2014-124971, when a compressor is working, at the same time as cold energy of a refrigerant that flows through the refrigerant flow tubes is transmitted to both side walls of a cold storage material container, and then the cold energy transmitted to both the side walls of the cold storage material container is directly transmitted to a cold storage material, the cold energy of a refrigerant is transmitted via the connecting part of the inner fin to a portion of the cold storage material distant from both the side walls of the cold storage material container. On the other hand, when the compressor stops, at the same time as cold energy stored in an entire cold storage material in cold storage material container is directly transmitted to both the side walls of the cold storage material container, the cold energy stored in the entire cold storage material is transmitted via the connecting part of the inner fin to the side walls of the cold storage material container, and then to the outer fin disposed in an adjacent gap via the refrigerant flow tubes.

SUMMARY

According to one aspect of the present invention, an evaporator with a cool storage function includes a first refrigerant flow tube, a second refrigerant flow tube, a cold storage material container, and a heat conductor. The first refrigerant flow tube includes a first tube wall and a second tube wall opposite to the first tube wall in a thickness direction of the first refrigerant flow tube. The second refrigerant flow tube includes a third tube wall and a fourth tube wall opposite to the third tube wall in the thickness direction. The first refrigerant flow tube and the second refrigerant flow tube are arranged such that the second tube wall is opposite to the third tube wall in the thickness direction. The cold storage material container contains a cold storage material therein and includes a first container wall and a second container wall opposite to the first container wall in the thickness direction. The cold storage material container is provided between the first refrigerant flow tube and the second refrigerant flow tube such that the first container wall contacts the second tube wall of the first refrigerant flow tube and the second container wall contacts the third tube wall of the second refrigerant flow tube. The heat conductor is provided in the cold storage material container. The heat conductor includes a base plate, first projections, and second projections. The base plate is apart from the first container wall and the second container wall of the cold storage material container. The first projections project from the base plate toward the first container wall to contact the first container wall. The second projections project from the base plate toward the second container wall to contact the second container wall.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
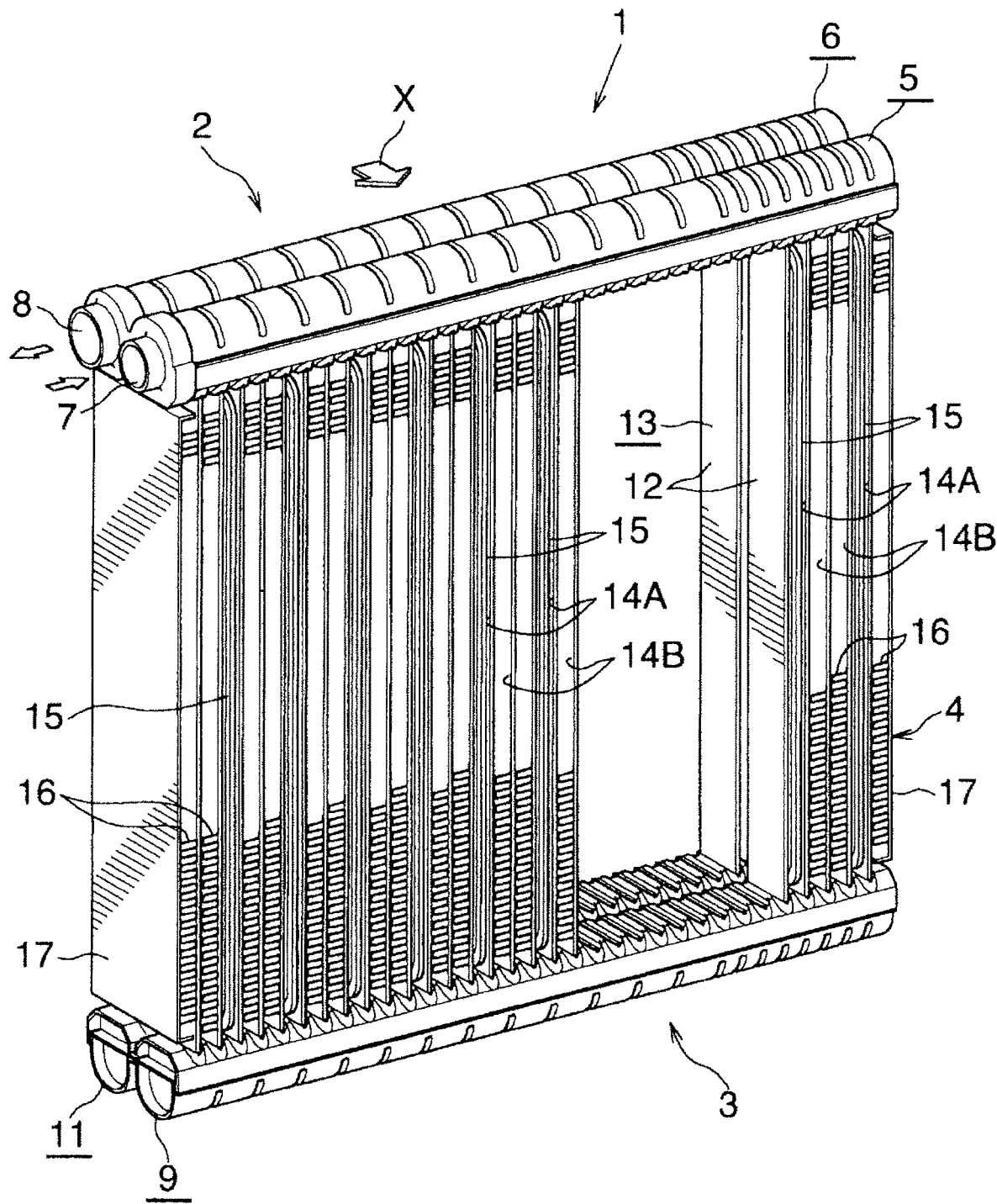
FIG. 1 is a partially omitted schematic perspective view illustrating an entire configuration of an evaporator with a cool storage function according to an embodiment of the present invention.

The embodiments will now be described with reference to the accompanying drawings, wherein like reference numerals designate corresponding or identical elements throughout the various drawings.

A downstream side of a ventilating direction indicated by an arrow X in the drawings is referred to as a front side, and a side opposite of the front side is referred to as a back side. Further, an upper side, a lower side, a right side, and a left side viewed from the downstream side of the ventilating direction indicated by the arrow X in the drawings (an upper side, a lower side, a right side, and a left side in FIG. 1) are referred to as an upper side, a lower side, a right side, and a left side, respectively.

In the following description, a term "aluminum" includes aluminum alloys in addition to pure aluminum.

FIG. 1 illustrates an entire configuration of an evaporator with a cool storage function according to an embodiment of the present invention, and FIG. 2 to FIG. 5 illustrate a configuration of its main part.

Referring to FIG. 1, an evaporator with a cool storage function (1) includes an aluminum upper header tank (2) and an aluminum lower header tank (3) that are disposed with a space in a top-bottom direction therebetween with their longitudinal directions along a right-left direction and their width directions along a front-back direction, and a heat exchanger core unit (4) provided between both the header tanks (2) and (3).

The upper header tank (2) includes a front-side upper header part (5) positioned on a front side (downwind side), and a back-side upper header part (6) positioned on a back side (upwind side) and integrated with the front-side upper header part (5). On a left end of the front-side upper header part (5), a refrigerant inlet (7) is disposed, and on a left end of the back-side upper header part (6), a refrigerant outlet (8) is disposed. The lower header tank (3) includes a front-side lower header part (9) positioned on the front side, and a back-side lower header part (11) positioned on the back side and integrated with the front-side lower header part (9).

In the heat exchanger core unit (4), between the front-side upper header part (5) and the front-side lower header part (9), and between the back-side upper header part (6) and the back-side lower header part (11), a plurality of aluminum flat-shaped refrigerant flow tubes (12) are arranged in the right-left direction with spaces therebetween, each of the refrigerant flow tubes (12) positioned with its longitudinal direction in the top-bottom direction, its width direction in the front-back direction, and its thickness direction in the right-left direction. Upper end parts of the refrigerant flow tubes (12) that are arranged on the front side are connected to the front-side upper header part (5), and lower end parts of the same refrigerant flow tubes (12) are connected to the front-side lower header part (9). Upper end parts of the refrigerant flow tubes (12) that are arranged on the back side are connected to the back-side upper header part (6), and lower end parts of the same refrigerant flow tubes (12) are connected to the back-side lower header part (11). The refrigerant flow tubes (12) that are arranged on the front side and the refrigerant flow tubes (12) that are arranged on the back side are located at the same positions in the right-left direction, and two refrigerant flow tubes (12) adjacent in the front-back direction form a tube pair (13). Between tube pairs (13) adjacent in the right-left direction, gaps (14A) and (14B) are formed.

Aluminum cold storage material containers (15) are respectively disposed within a plurality of container gaps (14A) which is part of all of the gaps (14A) and (14B) in the heat exchanger core unit (4), each cold storage material container being disposed over the two refrigerant flow tubes (12) that form each of the tube pairs (13). Each of the cold storage material containers (15) is in contact with and joined to the two refrigerant flow tubes (12) via a brazing material. Hereinafter, the joining via the brazing material is referred to as brazing. Outer fins (16) are respectively disposed within a plurality of fin gaps (14B) which is a remaining part of all of the gaps (14A) and (14B) in the heat exchanger core unit (4), each outer fin being disposed over the two refrigerant flow tubes (12) that form each of the tube pairs (13). Each of the outer fins (16) is constituted by an aluminum brazing sheet having brazing material layers on both sides, and includes a wave top part extending in the front-back direction, a wave bottom part extending in the front-back direction, and a connecting part coupling the wave top part and the wave bottom part. Each of the outer fins (16) is in contact with and brazed to the two refrigerant flow tubes (12). Further, the outer fins (16) are also disposed outside tube pairs (13) disposed on both right and left sides, each outer fin being disposed over the two refrigerant flow tubes (12) that form either of the tube pairs (13), and in contact with and brazed to the corresponding refrigerant flow tubes (12). Moreover, outside the outer fins (16) disposed on both right and left sides, aluminum side plates (17) are positioned and brazed to the corresponding outer fins (16).

In the case of the evaporator (1) of this embodiment, the refrigerant enters from the refrigerant inlet (7) into the front-side upper header part (5), then flows through all of the refrigerant flow tubes (12) and the lower header parts (9) and (11) into the back-side upper header part (6), and flows out through the refrigerant outlet (8). Air flows through the fin gaps (14B) in which the outer fins (16) are disposed, in a direction illustrated by an arrow X in the drawings.

Figure 2:
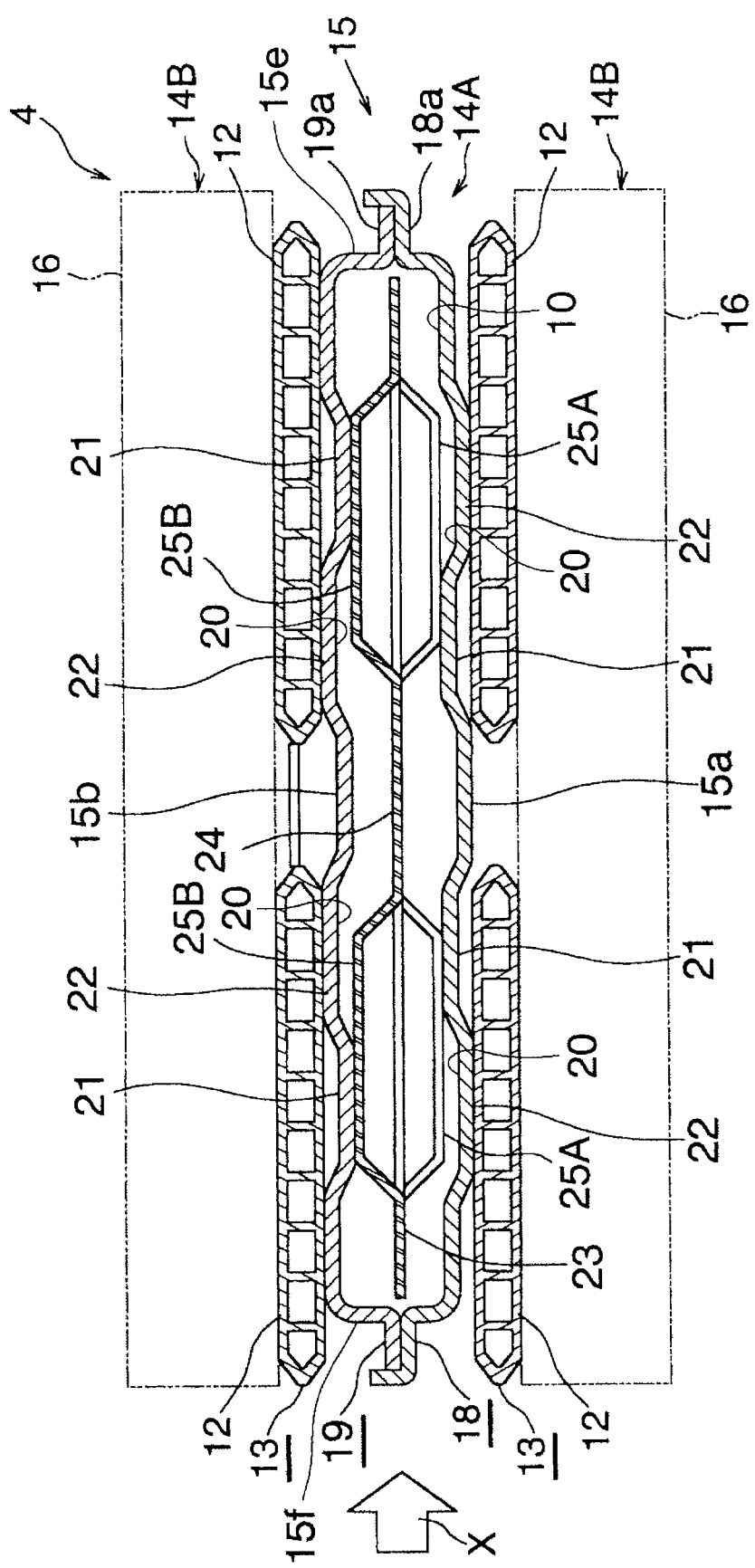
FIG. 2 is an enlarged schematic horizontal sectional view illustrating a cold storage material container and refrigerant flow tubes disposed on right and left of the cold storage material container used in the evaporator with a cool storage function of FIG. 1.
Figure 3:
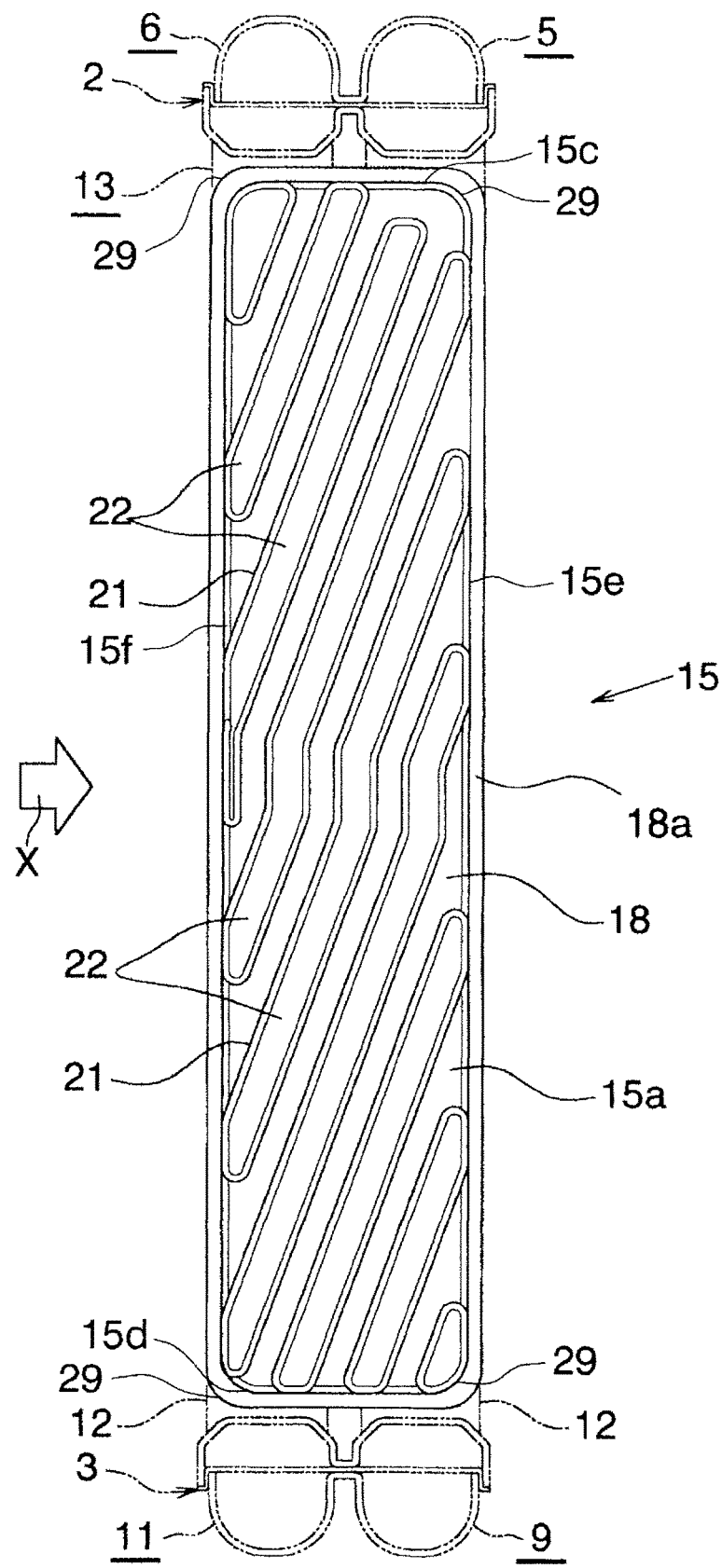
FIG. 3 is a schematic left side view illustrating the cold storage material container used in the evaporator with a cool storage function.
Figure 4:
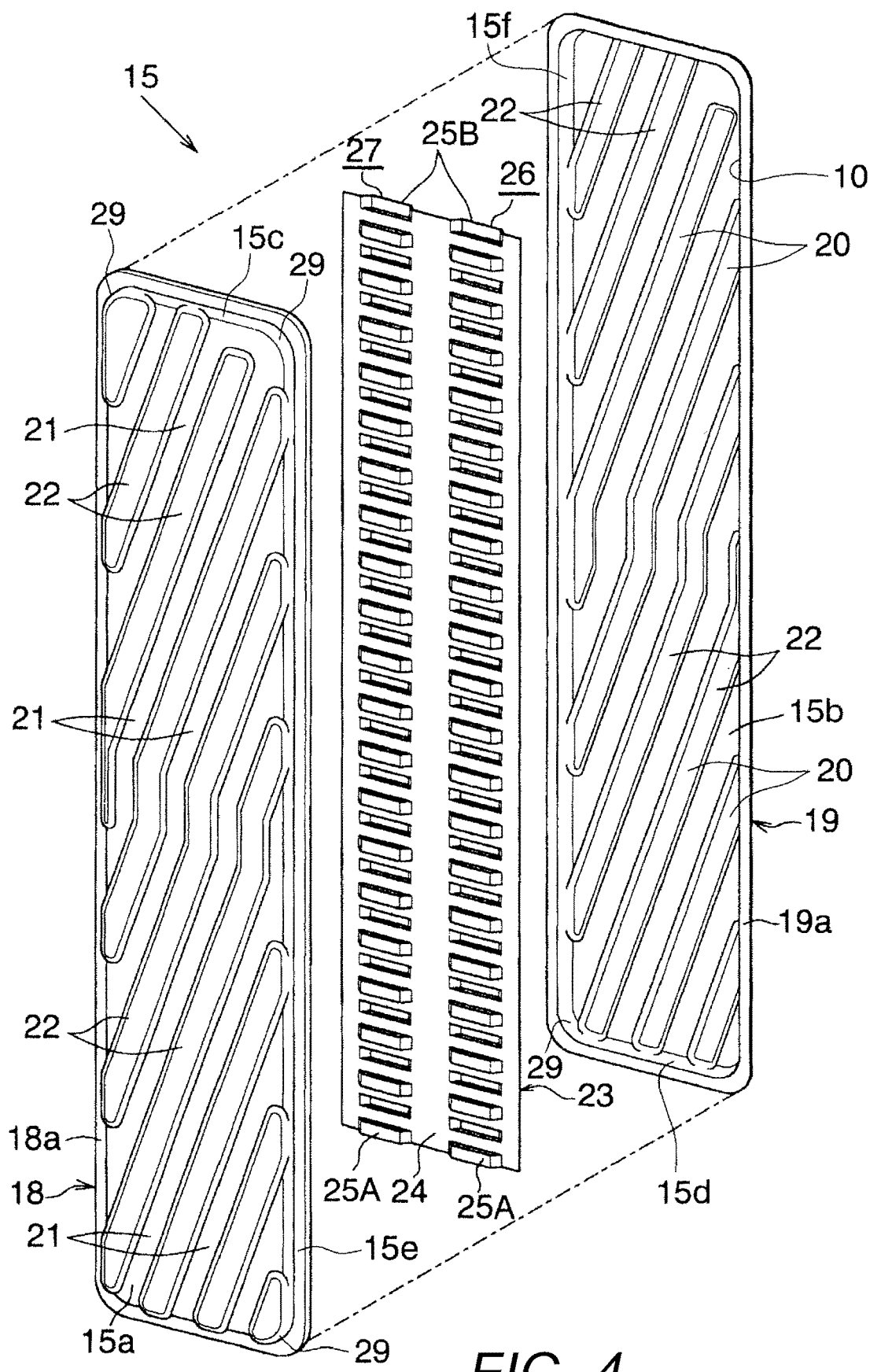
FIG. 4 is a schematic exploded perspective view illustrating the cold storage material container used in the evaporator with a cool storage function.

As illustrated in FIG. 2 to FIG. 4, each of the cold storage material containers (15) is in a substantially longitudinal rectangular shape that is flat and hollow, positioned within a full-length of the heat exchanger core unit (4) in the front-back direction with its longitudinal direction in the top-bottom direction and its width direction in the front-back direction. The cold storage material container (15) includes a left-side wall (15a), a right-side wall (15b), an upper-side wall (15c), a lower-side wall (15d), a front-side wall (15e), and a back-side wall (15f), as well as a hollow cold storage material enclosing part (cold storage material enclosing space) (10) surrounded by the side walls (15a) to (15f). The cold storage material container (15) is provided by press working to an aluminum brazing sheet having brazing material layers on both sides, and constituted by two substantially longitudinal rectangular aluminum container-constituting plates (18) and (19) in which strip-shaped parts (18a) and (19a) along the periphery having a constant width are brazed to each other. The cold storage material enclosing part (10) is provided by causing a portion excluding the strip-shaped parts (18a) and (19a) of at least one of the container-constituting plates (18) and (19), both of the container-constituting plates (18) and (19) in this example, to expand outward. The upper-side and the lower-side walls (15c) and (15d) and the front-side and back-side walls (15e) and (15f) of the cold storage material container (15) are constituted by portions of the container-constituting plates (18) and (19) which couple the left-side and right-side walls (15a) and (15b) with the strip-shaped parts (18a) and (19a). Four coupling parts (29) between the upper-side and the lower-side walls (15c) and (15d) and the front-side and back-side walls (15e) and (15f) of the cold storage material container (15) are in an arc shape.

An inner surface of each of the left-side and right-side walls (15a) and (15b) of the cold storage material container (15) is provided with a plurality of depressed parts (20) each open in the cold storage material enclosing part (10) and depressed outwardly in the right-left direction. An outer surface of each of the left-side and right-side walls (15a) and (15b) of the cold storage material container (15) is provided with a plurality of condensed water drainage paths (21) with intervals in the front-back direction, in which each of the condensed water drainage paths (21) has a constant channel length in the top-bottom direction, and its upper and lower ends are open. Condensed water is caused to flow from an upper side to a lower side to be drained through the opening on the lower end. Each of the condensed water drainage paths (21) is defined between two drainage path projecting parts (22) that are provided for the left-side and right-side walls (15a) and (15b) of the cold storage material container (15) and expand outward. A length of at least one of the two drainage path projecting parts (22) that constitute one condensed water drainage path (21) is longer than a width of the cold storage material containers (15) in the front-back direction. All of the drainage path projecting parts (22) of the left-side and right-side walls (15a) and (15b) of each of the cold storage material containers (15) have the same expanding height, and expanding end walls (projecting ends) of all of the drainage path projecting parts (22) are in the same vertical plane. Further, the expanding end walls of the drainage path projecting parts (22) within a range in the front-back direction of the two refrigerant flow tubes (12) that constitute the tube pairs (13) on the right and the left sides defining the container gap (14A) are brazed in a state of being in contact with the refrigerant flow tubes (12). It should be noted that the two adjacent condensed water drainage paths (21) share the drainage path projecting part (22) positioned between these condensed water drainage paths (21).

Further, on the inner side of the drainage path projecting parts (22), the depressed parts (20) are provided for the inner surface of each of the left-side and right-side walls (15a) and (15b) of the cold storage material container (15), each depressed part being open in the cold storage material enclosing part (10) and depressed outwardly in the right-left direction. As all of the drainage path projecting parts (22) of the left-side and right-side walls (15a) and (15b) of each of the cold storage material containers (15) have the same expanding height, and expanding end walls of all of the drainage path projecting parts (22) are in the same vertical plane, all of the depressed parts (20) have the same depth.

The condensed water drainage paths (21) and the drainage path projecting part (22) of the left-side wall (15a) and the condensed water drainage paths (21) and the drainage path projecting part (22) of the right-side wall (15b) of the cold storage material enclosing part (10) of the cold storage material container (15) are disposed in a displaced manner in the front-back direction in the same horizontal plane so as not to overlap as a whole. Alternatively, the condensed water drainage paths (21) and the drainage path projecting part (22) of the left-side wall (15a) and the condensed water drainage paths (21) and the drainage path projecting part

(22) of the right-side wall (15b) may be disposed symmetrically with respect to the vertical plane passing the center of the cold storage material containers (15) in the right-left direction so as to overlap as a whole. It should be noted that a minor amount of air flows within the condensed water drainage paths (21).

Figure 5:
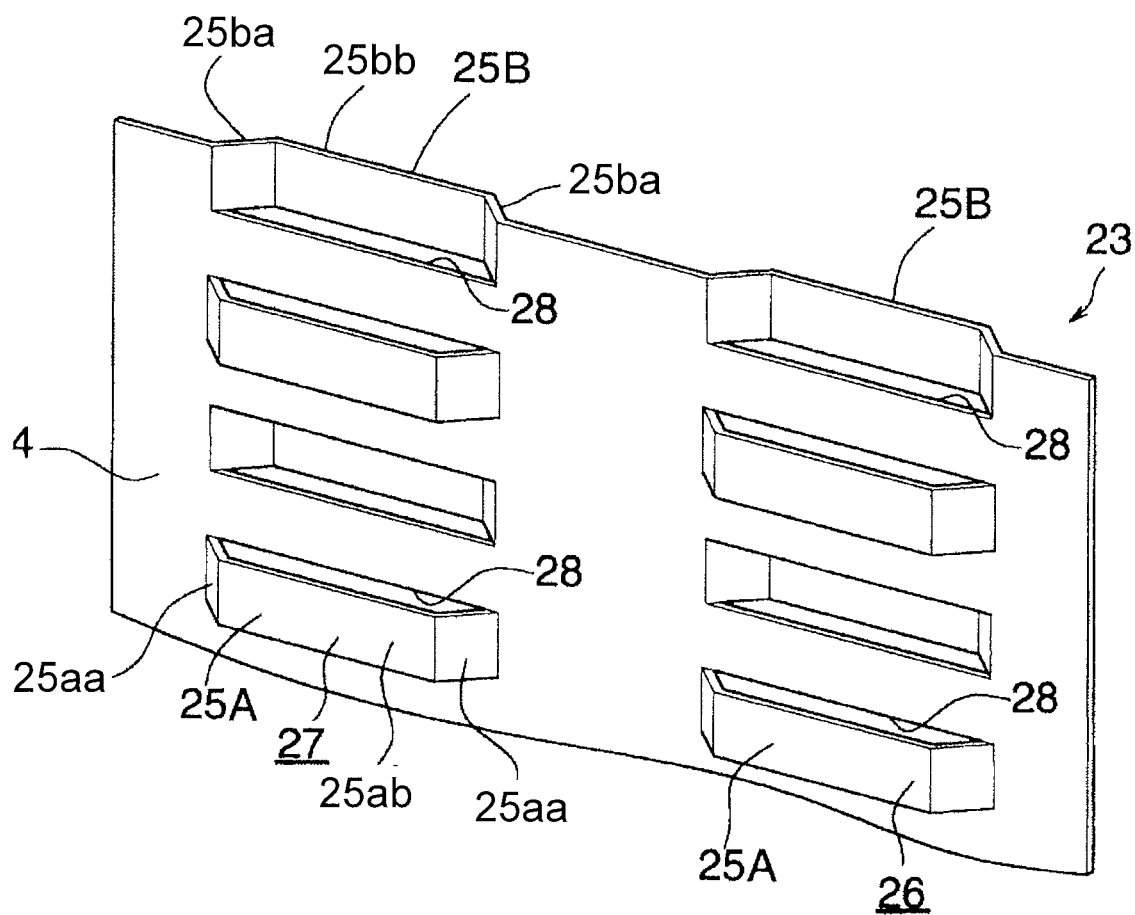
FIG. 5 is a schematic perspective view illustrating part of a heat conducting member disposed within the cold storage material container.

Within the cold storage material enclosing part (10) of the cold storage material container (15), an aluminum heat conducting member (23) is disposed substantially entirely over the cold storage material containers (15) in the top-bottom direction and in the front-back direction. The aluminum heat conducting member (15) corresponds to a heat conductor. As illustrated in FIG. 2, FIG. 4 and FIG. 5, the heat conducting member (23) includes a base plate (24) apart from the left-side and right-side walls (15a) and (15b) of the cold storage material containers (15), a plurality of left-projecting parts (25A) disposed so as to project leftward from a left-side surface of the base plate (24), and a plurality of right-projecting parts (25B) disposed so as to project rightward from a right-side surface of the base plate (24).

The base plate (24) of the heat conducting member (23) is configured to transmit heat in a planar direction. As used herein, the planar direction of the base plate (24) refers to a direction orthogonal to a thickness direction of the base plate (24). The base plate (24) of the heat conducting member (23) is in a vertically long rectangular shape, and four corners of the base plate (24) are respectively brought into contact with inner surfaces of the arc-shaped coupling parts (29), and this positions the base plate (24), i.e., the heat conducting member (23).

Tip ends of at least part of all of the left-projecting parts (25A) of the heat conducting member (23), all of the left-projecting parts (25A) in this example, are brazed in contact with portions of the inner surface of the left-side wall (15a) of the cold storage material container (15) where the depressed parts (20) are not formed, that is, portions of the inner surfaces that constitute bottom surfaces of the condensed water drainage paths (21). Further, tip ends of at least part of all of the right-projecting parts (25B) of the heat conducting member (23), all of the right-projecting parts (25B) in this example, are brazed in contact with portions of the inner surface of the right-side wall (15b) of the cold storage material containers (15) where the depressed parts (20) are not formed, that is, portions of the inner surfaces that constitute bottom surfaces of the condensed water drainage paths (21).

The base plate (24) is provided with a plurality of, two in this example, vertical lines of projecting parts (26) and (27) disposed apart from each other in the front-back direction, each of which is configured by the plurality of left-projecting parts (25A) and the plurality of right-projecting parts (25B) disposed at intervals in the top-bottom direction. All of the left-projecting parts (25A) and all of the right-projecting parts (25B) of each of the vertical lines of projecting parts (26) and (27) are disposed at the same position in the front-back direction, and the left-projecting parts (25A) and the right-projecting parts (25B) are arranged alternately in the top-bottom direction in each of the vertical lines of projecting parts (26) and (27). Out of the two vertical lines of projecting parts (26) and (27) on the front side and the back side, the left-projecting parts (25A) of one vertical line of projecting parts (26) and the left-projecting parts (25A) of the other vertical line of projecting parts (27), and the right-projecting parts (25B) of the one vertical line of projecting parts (26) and the right-projecting parts (25B) of the other vertical line of projecting parts (27) are disposed at the same position in the top-bottom direction. All of the left-projecting parts (25A) and all of the right-projecting parts (25B) of the front-side vertical line of projecting parts (26) are disposed between the front-side refrigerant flow tubes (12) on the right side and left side, and all of the left-projecting parts (25A) and all of the right-projecting parts (25B) of the back-side vertical line of projecting parts (27) are disposed between the back-side refrigerant flow tubes (12) on the right side and left side.

Each of the left-projecting parts (25A) includes two projecting pieces (25aa) and a contacting piece (25ab). Each projecting piece (25aa) is provided integrally with two opposing sides on the front side and the back side of a square through hole (28) elongated in the front-back direction and defined in the base plate (24) of the heat conducting member (23), and projects inside the through hole (28) and obliquely toward the left-side wall (15a) of the cold storage material containers (15). The contacting piece (25ab) integrally couples tip ends of the projecting pieces (25aa) and is blazed in plane-contact with the side wall (15a) of the cold storage material containers (15). Each of the right-projecting parts (25B) includes two projecting pieces (25ba) and a contacting piece (25bb). Each projecting piece (25ba) is provided integrally with two opposing sides on the front side and the back side of a square through hole (28) elongated in the front-back direction and defined in the base plate (24) of the heat conducting member (23), and projects inside the through hole (28) and obliquely toward the right-side wall (15b) of the cold storage material containers (15). The contacting piece (25bb) integrally couples tip ends of the projecting pieces (25ba) and is blazed in plane-contact with the side wall (15a) of the cold storage material containers (15). The left and the right projecting parts (25A) and (25B) and the through holes (28) are provided by causing a portion between a pair of vertically parallel slits in the base plate (24) to be projected.

The evaporator with a cool storage function (1) described above provides a refrigeration cycle along with a compressor using an engine of a vehicle as a driving source, a condenser (refrigerant cooling unit) for cooling a refrigerant discharged from the compressor, and an expansion valve (decompressor) for reducing a pressure of the refrigerant that passes through the condenser, and is mounted as a car air-conditioner in a vehicle, e.g., an automobile, that temporarily stops the engine as the driving source of the compressor when stops.

During normal cooling when the compressor is working, a low-pressure two-phase refrigerant of gas-liquid multiphase that is compressed by the compressor and passes the condenser and the expansion valve, goes through the refrigerant inlet (7) into the front-side upper header part (5) of the evaporator with a cool storage function (1), then through all of the refrigerant flow tubes (12) and both of the lower header parts (9) and (11) into the back-side upper header part (6), and flows out from the refrigerant outlet (8). While flowing through the refrigerant flow tubes (12), the refrigerant exchanges heat with air that flows through the fin gap (14B) between the outer fins (16) of the evaporator with a cool storage function (1), and then the refrigerant flows out in a gas phase. Specifically, to the air that passes through the fin gap (14B), cold energy of the refrigerant that flows through the refrigerant flow tubes (12) of the tube pair (13) disposed on both the right side and the left side of the fin gap (14B) is transmitted via the outer fins (16) to cool the air, and the cooled air is supplied to cool a vehicle interior.

When the compressor is working, cold energy of the refrigerant that flows through the refrigerant flow tubes (12) on both the right side and the left side of the container gap (14A) is transmitted through the expanding end walls of the drainage path projecting parts (22) provided for the left-side and right-side walls (15a) and (15b) of the cold storage material containers (15) to the left-side and right-side walls (15a) and (15b) as a whole including the expanding end walls, and then transmitted from the left-side and right-side walls (15a) and (15b) to the cold storage material within the cold storage material containers (15). Further, the cold energy transmitted to the left-side and right-side walls (15a) and (15b) as a whole of the cold storage material containers (15) is transmitted to the cold storage material through the left-projecting parts (25A) and the right-projecting parts (25B) of the heat conducting member (23). At the same time, the cold energy transmitted to the left-side and right-side walls (15a) and (15b) as a whole of the cold storage material containers (15) is transmitted to the base plate (24) through the left-projecting parts (25A) and the right-projecting parts (25B) of the heat conducting member (23), and after being transmitted through the base plate (24) in the planar direction, transmitted from the base plate (24) as a whole to a portion of the cold storage material distant from the left-side and right-side walls (15a) and (15b) of the cold storage material containers (15). In this manner, cold energy is stored in the cold storage material within the cold storage material containers (15).

Further, when the compressor is working, condensed water is produced on surfaces of the cold storage material containers (15), and the condensed water comes into the condensed water drainage paths (21), and is collected within the condensed water drainage paths (21) along the drainage path projecting parts (22) on both sides of the condensed water drainage paths (21) due to surface tension. As the collected condensed water increases, a gravity that works on the collected condensed water becomes greater than the surface tension, and the collected condensed water flows down within the condensed water drainage paths (21) and is discharged downward.

On the other hand, when the compressor is not working, the cold energy stored in the cold storage material within the cold storage material containers (15) is directly transmitted to the left-side and right-side walls (15a) and (15b) as a whole including the expanding end walls of the drainage path projecting part (22) of the cold storage material containers (15), and transmitted through the left-projecting parts (25A) and the right-projecting parts (25B) of the heat conducting member (23) to the left-side and right-side walls (15a) and (15b) as a whole of the cold storage material containers (15). At the same time, the cold energy stored in the portion of the cold storage material within the cold storage material containers (15) distant from the left-side and right-side walls (15a) and (15b) of the cold storage material containers (15) is transmitted to the base plate (24) of the heat conducting member (23), and after being transmitted through the base plate (24) in the planar direction, transmitted through the left-projecting parts (25A) and the right-projecting parts (25B) to the left-side and right-side walls (15a) and (15b) as a whole of the cold storage material containers (15). The cold energy transmitted to the left-side and right-side walls (15a) and (15b) of the cold storage material containers (15) is further transmitted to the outer fins (16) disposed in an adjacent fin gap (14B) through the refrigerant flow tubes (12), as well as to air that flows through the fin gap (14B) in which the outer fins (16) are disposed. Therefore, even if the temperature of air that flows through the evaporator with a cool storage function (1) increases, the air is cooled, and therefore it is possible to prevent cooling capability from quickly decreasing.

FIG. 6 to FIG. 16 respectively illustrate a first modified example to an eighth modified example of the heat conducting member (23) disposed within the cold storage material enclosing part (10) of the cold storage material containers (15).

Figure 6:
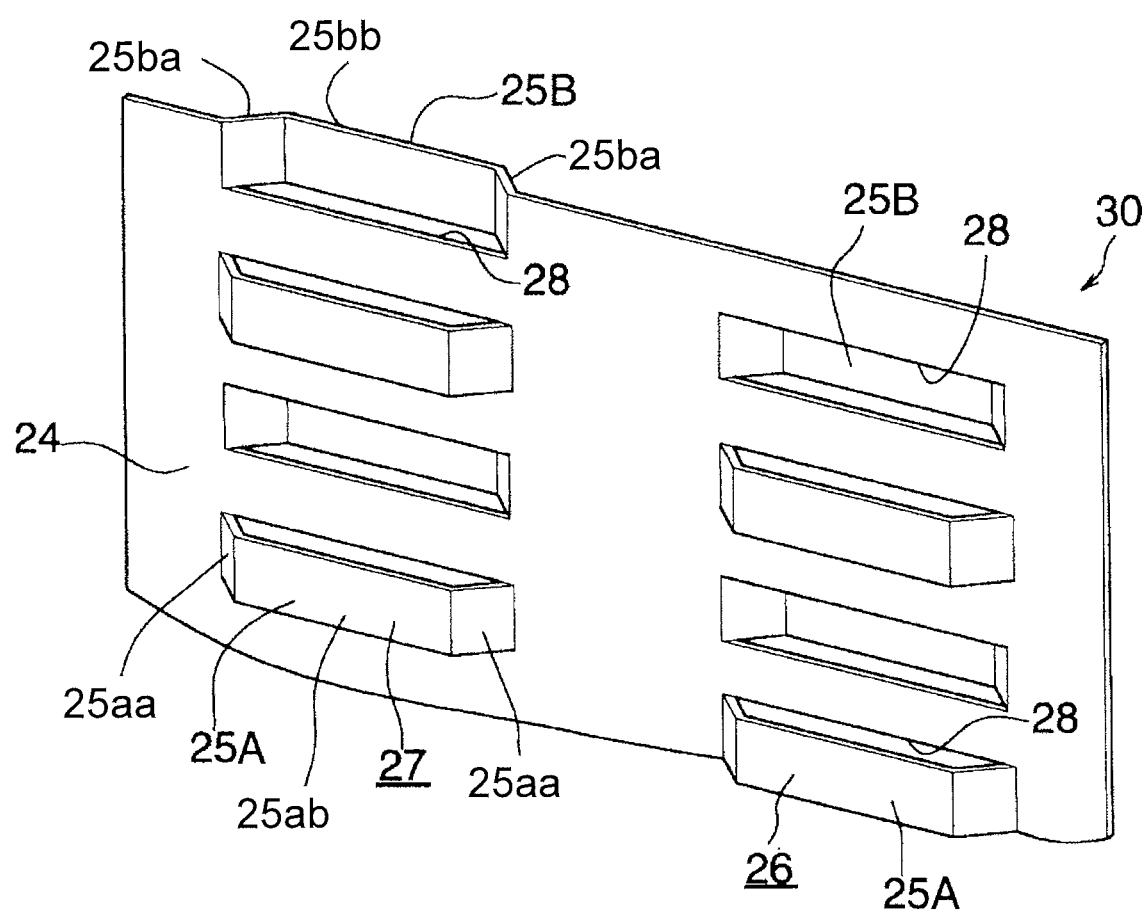
FIG. 6 is a schematic diagram corresponding to FIG. 5 illustrating a first modified example of the heat conducting member disposed within the cold storage material container.

In a case of a heat conducting member (30) of the first modified example illustrated in FIG. 6, one of the left-projecting parts (25A) and the right-projecting parts (25B) of the front-side vertical line of projecting parts (26) provided between the front-side refrigerant flow tubes (12) and one of the left-projecting parts (25A) and the right-projecting parts (25B) of the back-side vertical line of projecting parts (27) provided between the back-side refrigerant flow tubes (12) are displaced in the top-bottom direction. Specifically, the left-projecting parts (25A) of the front-side vertical line of projecting parts (26) are slightly displaced from the left-projecting parts (25A) and the right-projecting parts (25B) of the back-side vertical line of projecting parts (27) in the top-bottom direction, and the right-projecting parts (25B) of the front-side vertical line of projecting parts (26) are slightly displaced from the left-projecting parts (25A) and the right-projecting parts (25B) of the back-side vertical line of projecting parts (27) in the top-bottom direction.

Other parts of the configuration are the same as those of the heat conducting member (23) of the embodiment described above.

Figure 7:
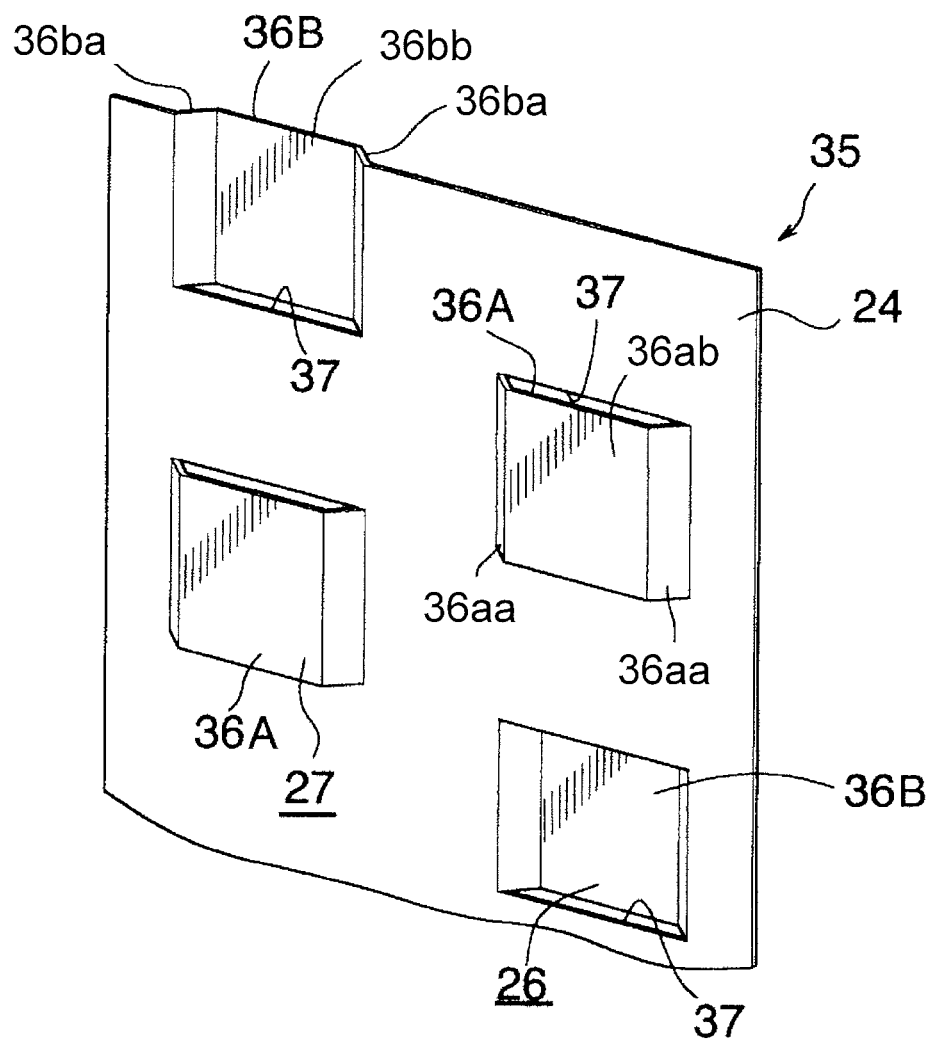
FIG. 7 is a schematic diagram corresponding to FIG. 5 illustrating a second modified example of the heat conducting member disposed within the cold storage material container.

In a case of a heat conducting member (35) of the second modified example illustrated in FIG. 7, each of left-projecting parts (36A) is provided integrally with two opposing sides on the front side and the back side of a substantially regular square through hole (37) defined in the base plate (24). Each of the left-projecting parts (36A) includes two projecting pieces (36aa) projecting inside the through hole (37) and obliquely toward the left-side wall (15a) of the cold storage material containers (15), and a contacting piece (36ab) that integrally couples tip ends of the projecting pieces (36aa) and that is blazed in plane-contact with the left-side wall of the cold storage material containers (15). Each of the right-projecting parts (36B) is provided integrally with two opposing sides on the front side and the back side of a substantially regular square through hole (37) defined in the base plate (24). Each of the right-projecting parts (36B) includes two projecting pieces (36ba) projecting inside the through hole (37) and obliquely toward the right-side wall (15b) of the cold storage material containers (15), and a contacting piece (36bb) that integrally couples tip ends of the projecting pieces (36ba) and that is blazed in plane-contact with the right-side wall (15b) of the cold storage material containers (15). Widths of the left-projecting parts (36A) and the right-projecting parts (36B) in the top-bottom direction are greater than widths of the left-projecting parts (25A) and the right-projecting parts (25B) in the top-bottom direction of the embodiment described above.

The plurality of left-projecting parts (36A) and the plurality of right-projecting parts (36B) are arranged so as to project alternately side to side at intervals in the top-bottom direction between the front-side refrigerant flow tubes (12) and between the back-side refrigerant flow tubes (12). The plurality of left-projecting parts (36A) and the plurality of right-projecting parts (36B) provided between the front-side refrigerant flow tubes (12) constitute the front-side vertical line of projecting parts (26), and the plurality of left-projecting parts (36A) and the plurality of right-projecting parts (36B) provided between the back-side refrigerant flow tubes (12) constitute the back-side vertical line of projecting parts (27). The left-projecting parts (36A) of the front-side vertical line of projecting parts (26) are completely displaced in the top-bottom direction from the left-projecting parts (36A) and the right-projecting parts (36B) of the back-side vertical line of projecting parts (27), and similarly the right-projecting parts (36B) of the front-side vertical line of projecting parts (26) are completely displaced in the top-bottom direction from the left-projecting parts (36A) and the right-projecting parts (36B) of the back-side vertical line of projecting parts (27). At a position whose height corresponds to a height of a position between a pair of a left-projecting part (36A) and a right-projecting part (36B) of the front-side vertical line of projecting parts (26) that are vertically adjacent, a left-projecting part (36A) or a right-projecting part (36B) of the back-side vertical line of projecting parts (27) is positioned.

Other parts of the configuration are the same as those of the heat conducting member (23) of the embodiment described above.

Figure 8:
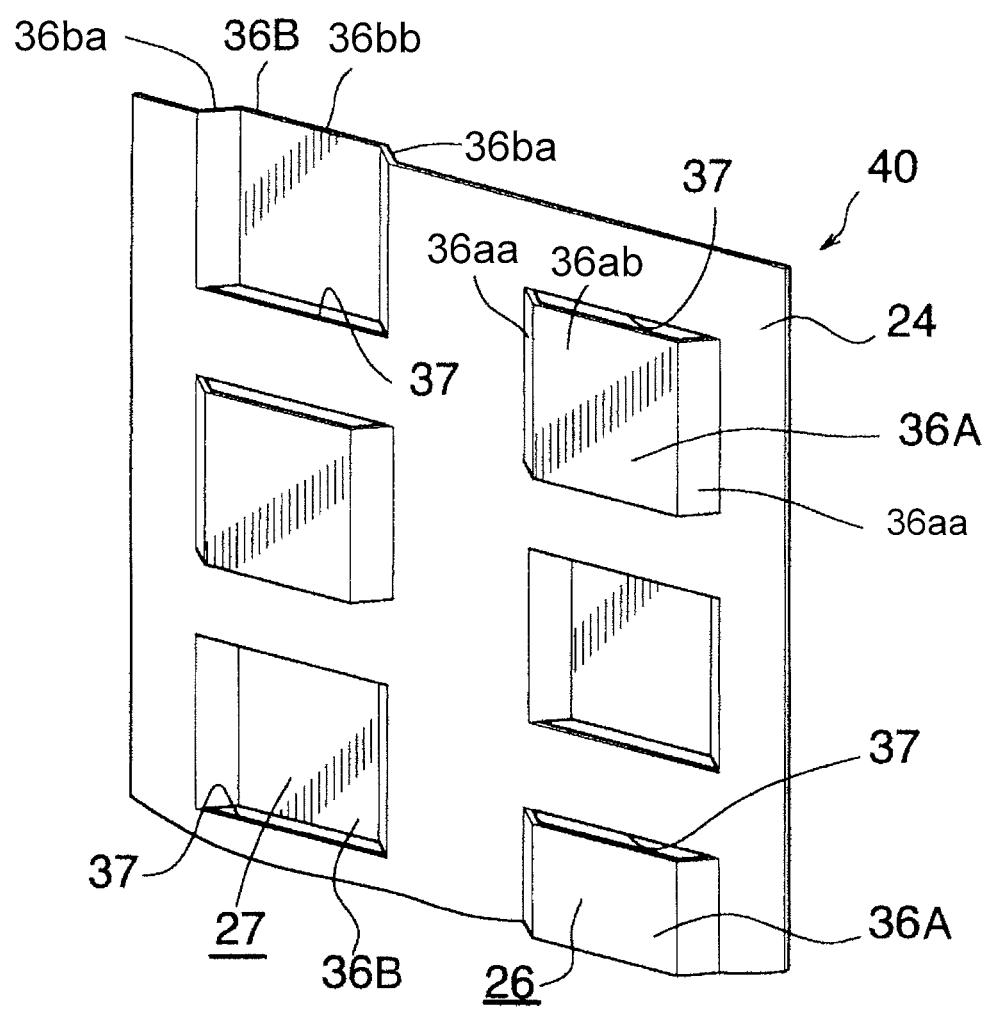
FIG. 8 is a schematic diagram corresponding to FIG. 5 illustrating a third modified example of the heat conducting member disposed within the cold storage material container.

In a case of a heat conducting member (40) of the third modified example illustrated in FIG. 8, the left-projecting parts (36A) of the front-side vertical line of projecting parts (26) and the left-projecting parts (36A) and the right-projecting parts (36B) of the back-side vertical line of projecting parts (27) are displaced in the top-bottom direction but their vertical positions partially overlap, and the right-projecting parts (36B) of the front-side vertical line of projecting parts (26) and the left-projecting parts (36A) and the right-projecting parts (36B) of the back-side vertical line of projecting parts (27) are displaced in the top-bottom direction but their vertical positions partially overlap.

Other parts of the configuration are the same as those of the heat conducting member (35) of the second modified example described above.

Figure 9:
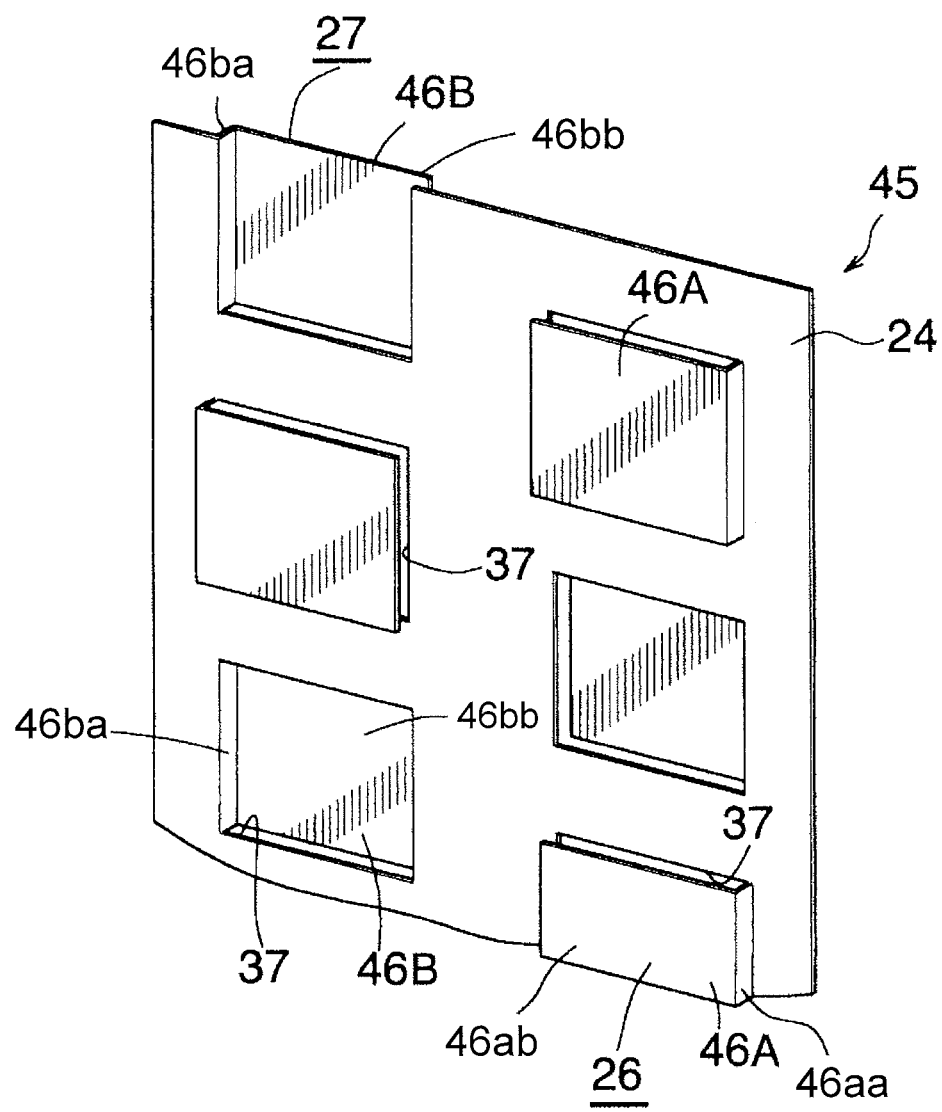
FIG. 9 is a schematic diagram corresponding to FIG. 5 illustrating a fourth modified example of the heat conducting member disposed within the cold storage material container.

In a case of a heat conducting member (45) of the fourth modified example illustrated in FIG. 9, each of left-projecting parts (46A) includes one projecting piece (46aa) and a contacting piece (46ab). The projecting piece (46aa) is provided integrally with one of sides on the front side and the back side of the substantially regular square through hole (37) defined in the base plate (24), and projects straight toward a side of the left-side wall (15a) of the cold storage material containers (15). The contacting piece (46ab) is provided integrally with a tip end of the projecting piece (46a) so as to project toward a side opposing to the one side of the through hole (37) along which the projecting piece (46aa) is provided, and the contacting piece (46b) is blazed in plane-contact with the left-side wall (15a) of the cold storage material containers (15). Each of right-projecting parts (46B) includes one projecting piece (46ba) and a contacting piece (46bb). The projecting piece (46ba) is provided integrally with one of sides on the front side and the back side of the substantially regular square through hole (37) defined in the base plate (24), and projects straight toward a side of the right-side wall (15b) of the cold storage material containers (15). The contacting piece (46bb) is provided integrally with a tip end of the projecting piece (46ba) so as to project toward a side opposing to the one side of the through hole (37) along which the projecting piece (46ba) is provided, and the contacting piece (46bb) is blazed in plane-contact with the right-side wall (15b) of the cold storage material containers (15).

The plurality of left-projecting parts (46A) and the plurality of right-projecting parts (46B) of the heat conducting member (45) are arranged so as to project alternately side to side at intervals in the top-bottom direction between the front-side refrigerant flow tubes (12) and between the back-side refrigerant flow tubes (12). The plurality of left-projecting parts (46A) and the plurality of right-projecting parts (46B) provided between the front-side refrigerant flow tubes (12) constitute the front-side vertical line of projecting parts (26), and the plurality of left-projecting parts (46A) and the plurality of right-projecting parts (46B) provided between the back-side refrigerant flow tubes (12) constitute the back-side vertical line of projecting parts (27). The projecting piece (46a) of each of the left-projecting parts (46A) and the right-projecting parts (46B) of the front-side vertical line of projecting parts (26) is along the front side of the through hole (37), and the projecting piece (46a) of each of the left-projecting parts (46A) and the right-projecting parts (46B) of the back-side vertical line of projecting parts (27) is along the back side of the through hole (37). Further, the left-projecting parts (46A) of the front-side vertical line of projecting parts (26) are displaced in the top-bottom direction from the left-projecting parts (46A) and the right-projecting parts (46B) of the back-side vertical line of projecting parts (27), and the right-projecting parts (46B) of the front-side vertical line of projecting parts (26) are displaced in the top-bottom direction from the left-projecting parts (46A) and the right-projecting parts (46B) of the back-side vertical line of projecting parts (27). Each of the projecting parts (46A) and (46B) on both the left and right sides is provided by causing a portion in a substantially U-shaped slit in the base plate (24) to be projected. Other parts of the configuration are the same as those of the heat conducting member (35) of the second modified example described above.

According to the heat conducting member (23) of the embodiment and the heat conducting members (30), (35), (40), and (45) of the first to fourth modified examples described above, when the cold storage material is in a liquid phase, a large movement of the cold storage material within the cold storage material containers (15) in the front-back direction can be reduced due to an effect of the projecting pieces (25aa), (25ba), (36aa), (36ba), (46aa), and (46ba) of the projecting parts (25A), (25B), (36A), (36B), (46A), and (46B) on both the left side and right side. Therefore, it is possible to reduce generation of abnormal noises due to a large movement of the cold storage material within the cold storage material containers (15).

Figure 10:
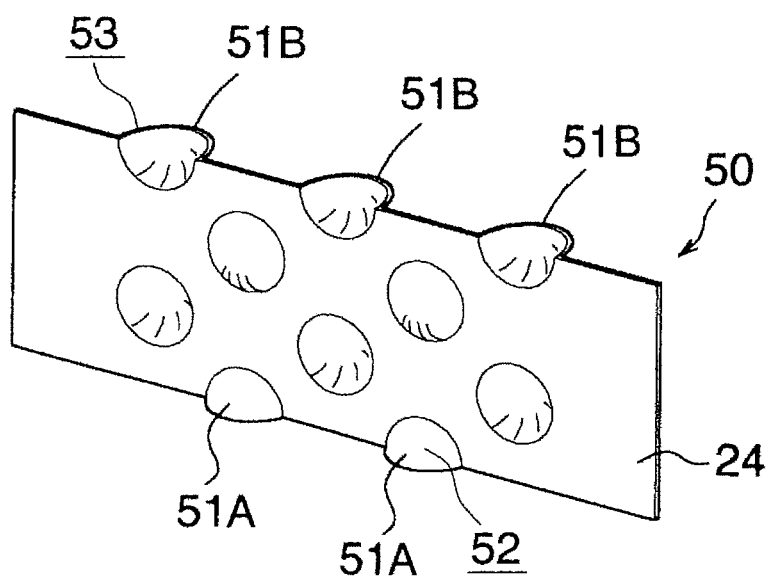
FIG. 10 is a schematic diagram corresponding to FIG. 5 illustrating a fifth modified example of the heat conducting member disposed within the cold storage material container.

In a case of a heat conducting member (50) of the fifth modified example illustrated in FIG. 10, over the base plate (24) as a whole, expanded left-projecting parts (51A) that are partially spherical and project leftward and expanded right-projecting parts (51B) that are partially spherical and project rightward are arranged in a houndstooth pattern, and the left-projecting parts (51A) and the right-projecting parts (51B) are most closely positioned. Specifically, the base plate (24) is provided with lateral lines of left-projecting parts (52) including the plurality of left-projecting parts (51A) provided at intervals in the front-back direction, and lateral lines of right-projecting parts (53) including the plurality of right-projecting parts (51B) provided at intervals in the front-back direction such that the lateral lines of left-projecting parts (52) and the lateral lines of right-projecting parts (53) are arranged alternately at intervals in the top-bottom direction. Further, all of the left-projecting parts (51A) of the lateral lines of left-projecting parts (52) and all of the right-projecting parts (51B) of the lateral lines of right-projecting parts (53) are disposed at the same position in the top-bottom direction. The left-projecting parts (51A) of one lateral line of left-projecting parts (52) are displaced in the front-back direction from the right-projecting parts (51B) of the lateral lines of right-projecting parts

(53) adjacent to this lateral line of left-projecting parts (52). Between the front-side refrigerant flow tubes (12) and between the back-side refrigerant flow tubes (12), at least part of the left-projecting parts (51A) and the right-projecting parts (51B) of the heat conducting member (50) are provided. The projecting parts (51) are provided by press working to the base plate (24).

Figure 11:
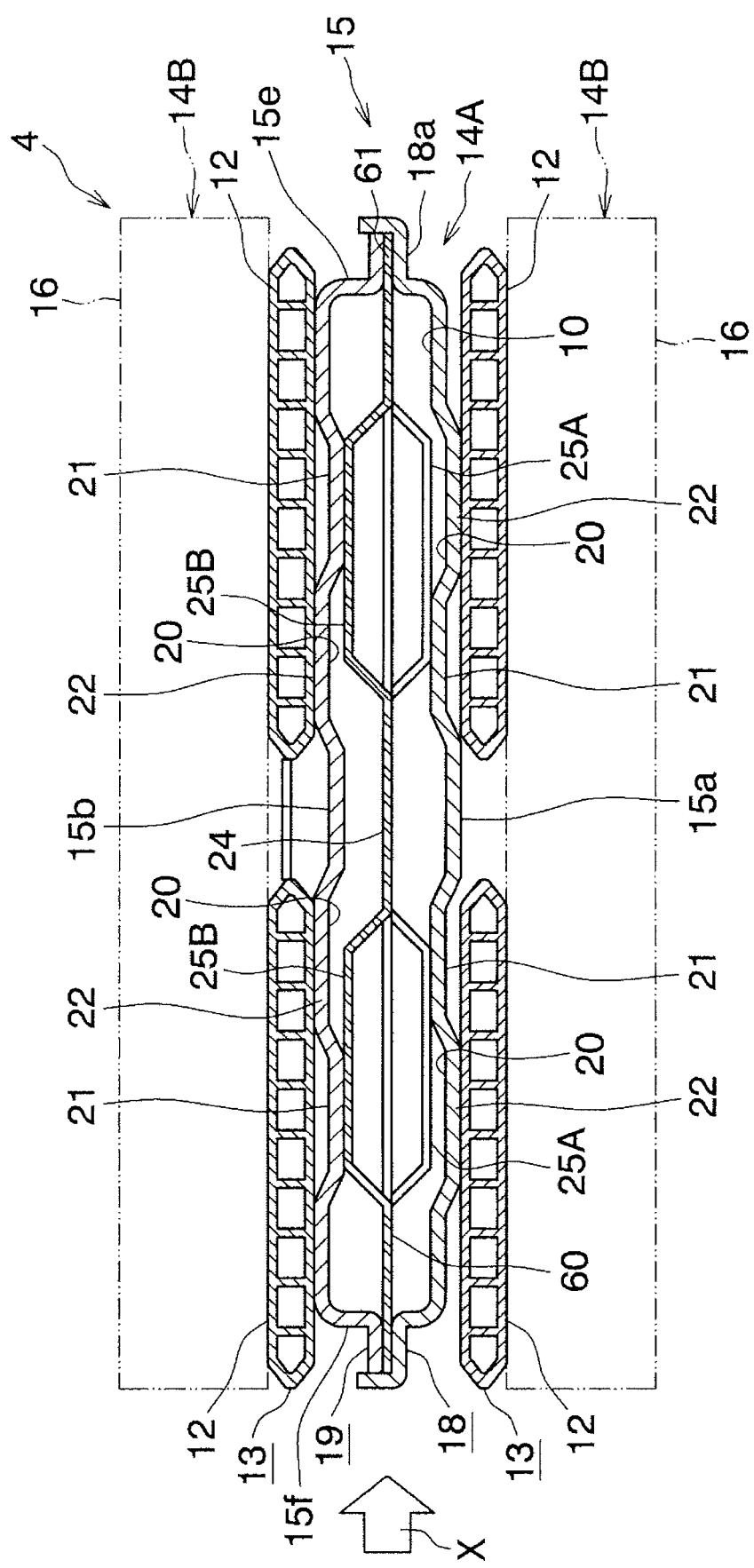
FIG. 11 is a schematic diagram corresponding to FIG. 2 illustrating a sixth modified example of the heat conducting member disposed within the cold storage material container.
Figure 12:
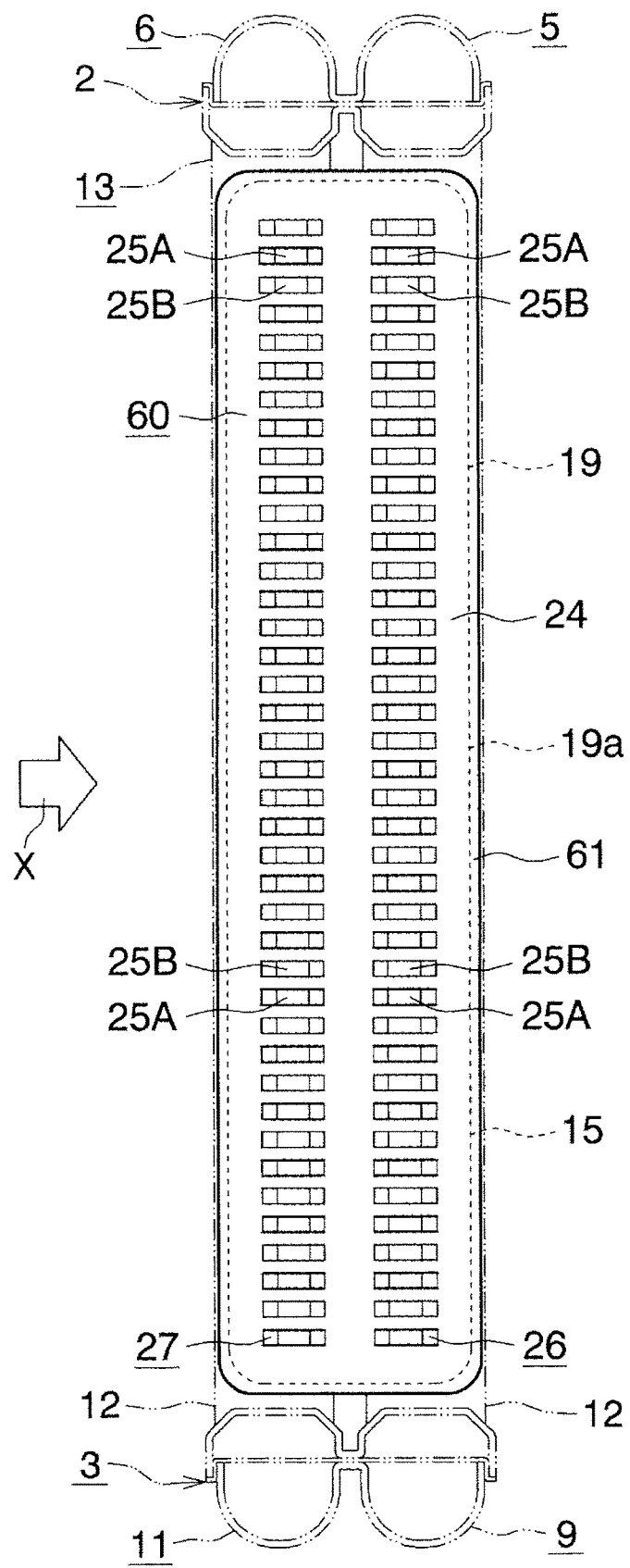
FIG. 12 is a partially omitted schematic left side view illustrating the sixth modified example of the heat conducting member disposed within the cold storage material container, in a state in which a left container-constituting plate of the cold storage material container having the heat conducting member of the modified example is removed.

In a case of a heat conducting member (60) of the sixth modified example illustrated in FIG. 11 and FIG. 12, a protruding part (61) that protrudes outward relative to the cold storage material enclosing part (10) is provided along an entire length of the peripheral part of the base plate (24). The protruding part (61) corresponds to an outer perimeter of the base plate (24). The protruding part (61) is brazed to the strip-shaped parts (18a) and (19a) of the container-constituting plates (18) and (19) that constitute the cold storage material container (15) in a state in which the protruding part (61) is sandwiched between the strip-shaped parts (18a) and (19a).

Other parts of the configuration are the same as those of the heat conducting member (23) of the embodiment described above.

Figure 13:
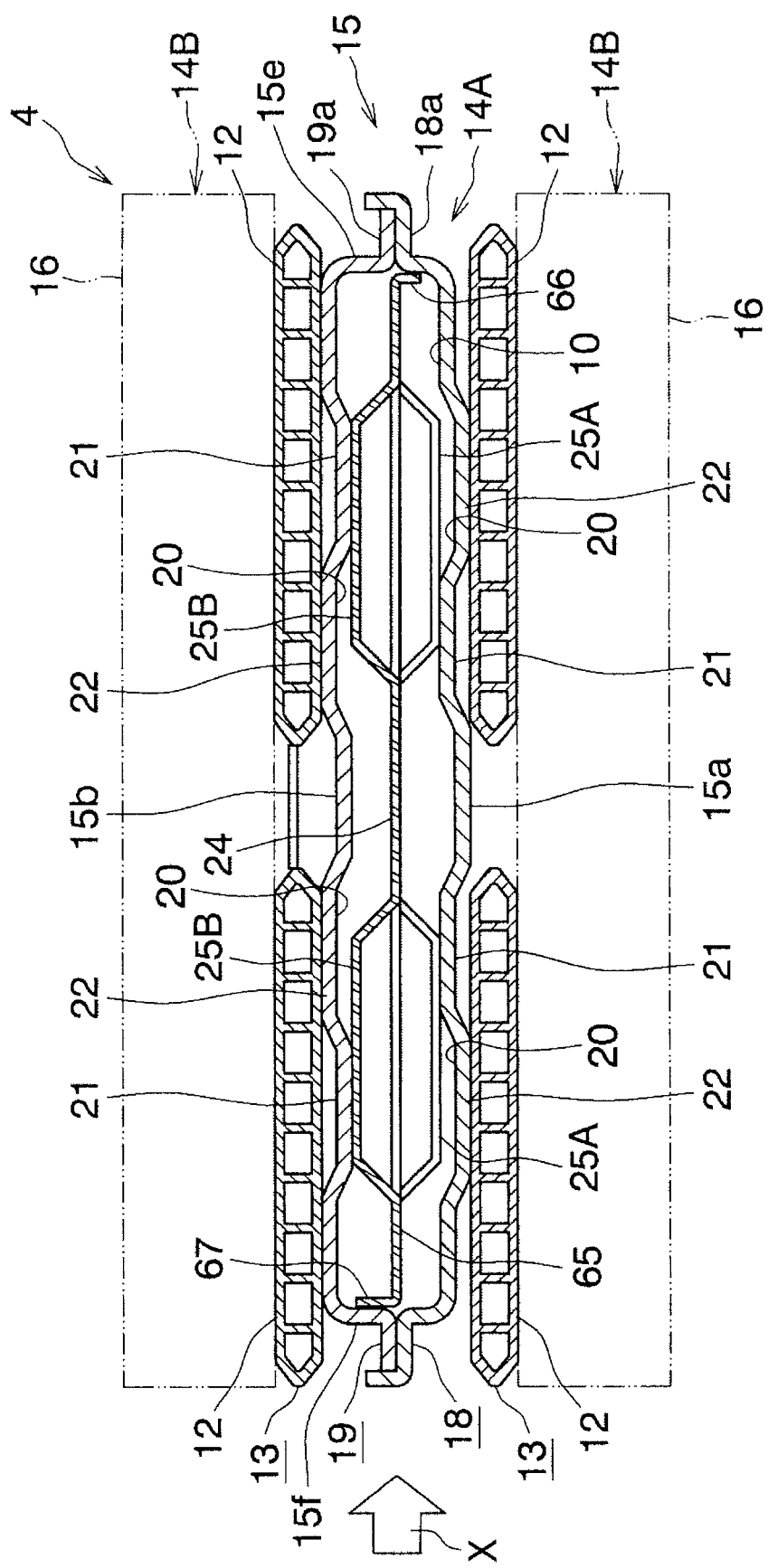
FIG. 13 is a schematic diagram corresponding to FIG. 2 illustrating a seventh modified example of the heat conducting member disposed within the cold storage material container.
Figure 14:
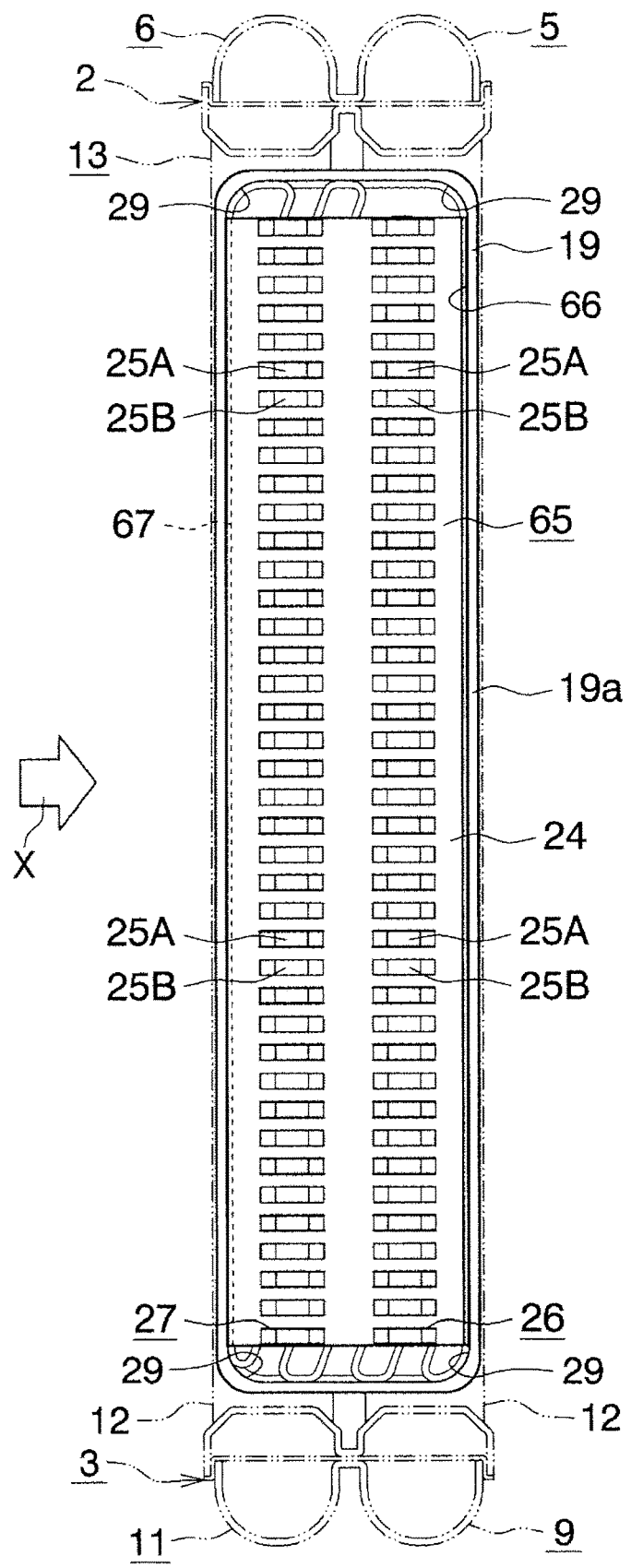
FIG. 14 is a schematic left side view illustrating the seventh modified example of the heat conducting member disposed within the cold storage material container, in a state in which a left container-constituting plate of the cold storage material container having the heat conducting member of the modified example is removed.

In a case of a heat conducting member (65) of the seventh modified example illustrated in FIG. 13 and FIG. 14, a front-side protruding wall (66) protruding toward left or right is provided along a front-side peripheral part of the base plate (24), and a back-side protruding wall (67) protruding toward left or right is provided along a back-side peripheral part of the base plate (24). In the illustrated example, the front-side protruding wall (66) protruding leftward is provided along the front-side peripheral part of the base plate (24), and the back-side protruding wall (67) protruding rightward is provided along the back-side peripheral part of the base plate (24). The front-side protruding wall (66) of the base plate (24) is brazed to the inner surface of the front-side wall (15e) of the cold storage material container (15), and the back-side protruding wall (67) is brazed to the inner surface of the back-side wall (15f) of the cold storage material container. Other parts of the configuration are the same as those of the heat conducting member (23) of the embodiment described above.

Figure 15:
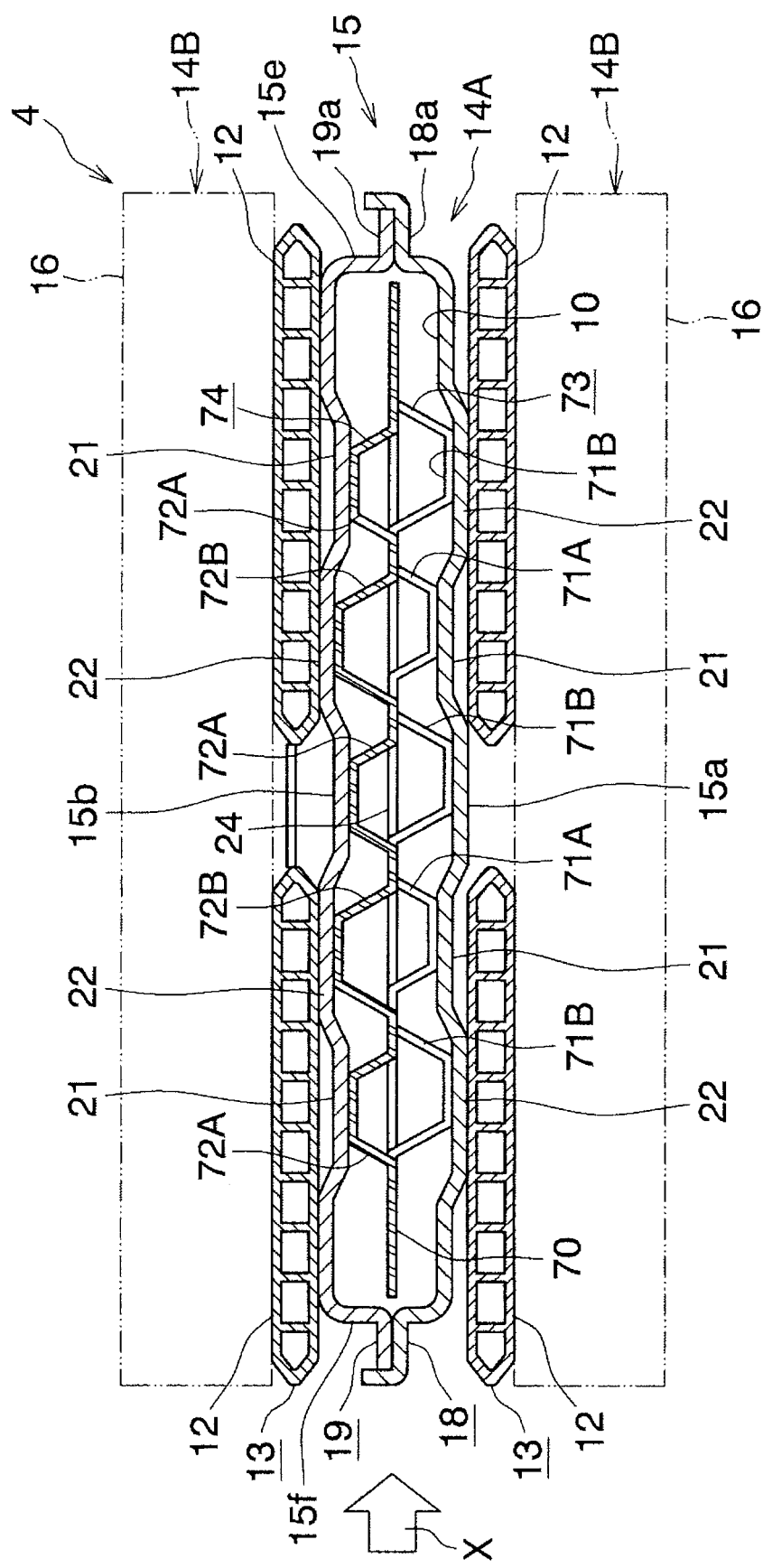
FIG. 15 is a schematic diagram corresponding to FIG. 2 illustrating an eighth modified example of the heat conducting member disposed within the cold storage material container.
Figure 16:
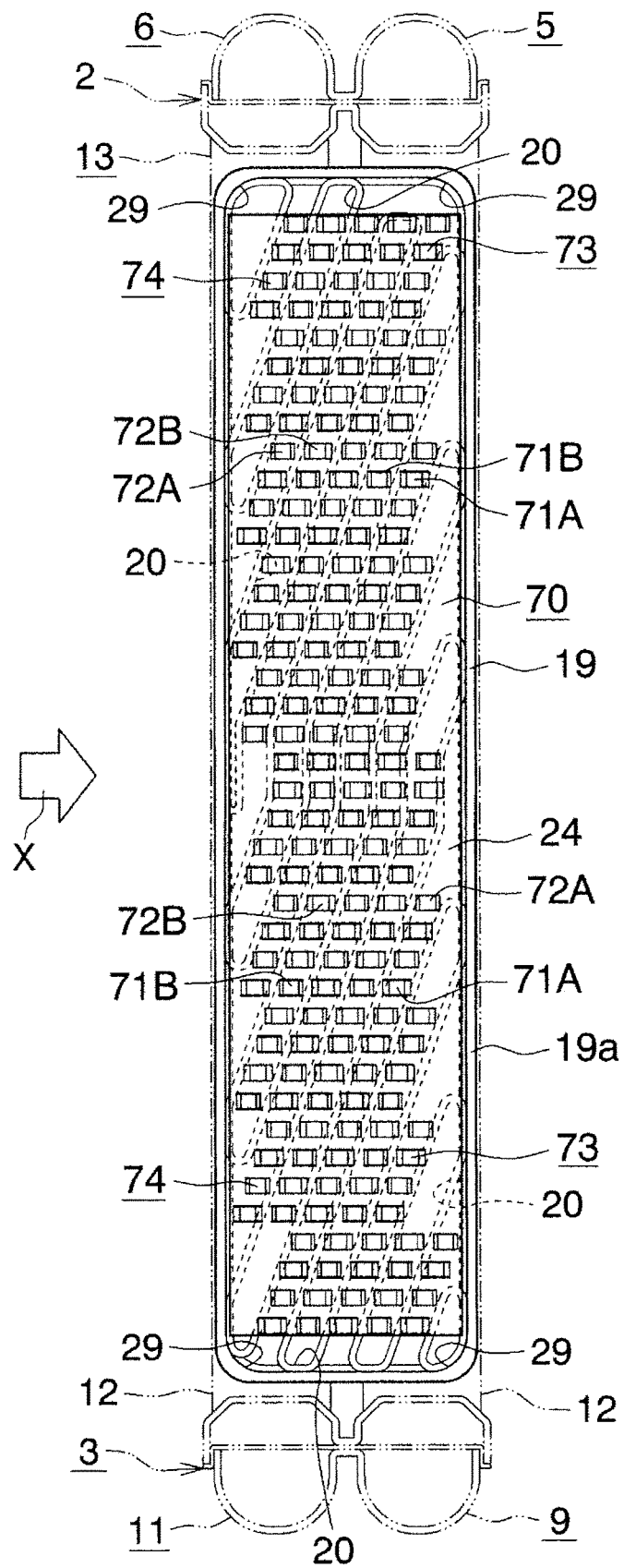
FIG. 16 is a schematic left side view illustrating the eighth modified example of the heat conducting member disposed within the cold storage material container, in a state in which a left container-constituting plate of the cold storage material container having the heat conducting member of the modified example is removed.

In a case of a heat conducting member (70) of the eighth modified example illustrated in FIG. 15 and FIG. 16, the base plate (24) is provided with lateral lines of left-projecting parts (73) including a plurality of left-projecting parts (71A) and (71B) provided at intervals in the front-back direction, and lateral lines of right-projecting parts (74) including a plurality of right-projecting parts (72A) and (72B) provided at intervals in the front-back direction such that the lateral lines of left-projecting parts (73) and the lateral lines of right-projecting parts (74) are arranged alternately at intervals in the top-bottom direction. Further, all of the left-projecting parts (71A) and (71B) of the lateral lines of left-projecting parts (73) and all of the right-projecting parts (72A) and (72B) of the lateral lines of right-projecting parts (74) are disposed at the same position in the top-bottom direction.

All of the left-projecting parts (71A) and (71B) of the heat conducting member (70) include a plurality of types, two types in this example, of the left-projecting parts (71A) and (71B) whose projecting heights from a left-side surface of the base plate (24) are different, and all of the right-projecting parts (72A) and (72B) of the heat conducting member (70) include a plurality of types, two types in this example, of the right-projecting parts (72A) and (72B) whose projecting heights from a right-side surface of the base plate (24) are different. Each of the lateral lines of left-projecting parts (73) also includes two types of the left-projecting parts (71A) and (71B) whose projecting heights from the left-side surface of the base plate (24) are different, and each of the lateral lines of right-projecting parts (74) also includes two types of the right-projecting parts (72A) and (72B) whose projecting heights from the right-side surface of the base plate (24) are different.

Further, tip ends of the left-projecting parts (71A) whose projecting heights from the left-side surface of the base plate (24) is low are brazed in contact with portions of the inner surface of the left-side wall (15a) of the cold storage material container (15) where the depressed parts (20) are not formed, that is, portions of the inner surface that constitute bottom surfaces of the condensed water drainage paths (21), and tip ends of the left-projecting parts (71B) whose projecting heights from the left-side surface of the base plate (24) is high are brazed in contact with bottom surfaces of the depressed parts (20) provided within the drainage path projecting part (22). Further, tip ends of the right-projecting parts (72A) whose projecting heights from the right-side surface of the base plate (24) is low are brazed in contact with portions of the inner surface of the right-side wall (15b) of the cold storage material container (15) where the depressed parts (20) are not formed, that is, portions of the inner surface that constitute bottom surfaces of the condensed water drainage paths (21), and tip ends of the right-projecting parts (72B) whose projecting heights from the right-side surface of the base plate (24) is high are brazed in contact with bottom surfaces of the depressed parts (20) provided within the drainage path projecting part (22). Other parts of the configuration are the same as those of the heat conducting member (23) of the embodiment described above.

While the left-projecting parts (71A) and (71B) and the right-projecting parts (72A) and (72B) in this example have the same configuration as the configuration of the left-projecting parts (25A) and the right-projecting parts (25B) of the heat conducting member (23) of the embodiment described above, it is possible to employ the same configuration as the configuration of the left and the right projecting parts (36A), (36B), (46A), and (46B) of the first to fifth modified examples of the heat conducting member (23) illustrated in FIG. 6 to FIG. 10.

According to a first aspect of the present invention, an evaporator with a cool storage function includes a plurality of refrigerant flow tubes arranged at intervals in a right-left direction and cold storage material containers in each of which a cold storage material is enclosed, each of the cold storage material containers having a left-side wall and a right-side wall. Gaps are provided between adjacent refrigerant flow tubes. The cold storage material containers are disposed in a plurality of gaps as part of all of the gaps so as to be in contact with the refrigerant flow tubes. A heat conducting member is disposed within each of the cold storage material containers. The heat conducting member includes a base plate distant from the left-side wall and the right-side wall of the corresponding cold storage material container, a plurality of left-projecting parts projecting leftward from a left-side surface of the base plate, and a plurality of right-projecting parts projecting rightward from a right-side surface of the base plate. Tip ends of at least part of all of the left-projecting parts are in contact with an inner surface of the left-side wall of the cold storage material container. Tip ends of at least part of all of the right-projecting parts are in contact with an inner surface of the right-side wall of the cold storage material container.

According to a second aspect of the present invention, in the evaporator with a cool storage function according to the first aspect, the refrigerant flow tubes are flat-shaped, in which a longitudinal direction of the refrigerant flow tubes is in a top-bottom direction and a width direction of the refrigerant flow tubes is in a front-back direction, and outer fins are provided in a plurality of gaps as a remaining part of the all of the gaps so as to be in contact with the refrigerant flow tubes.

According to a third aspect of the present invention, in the evaporator with a cool storage function according to the first aspect or the second aspect, the base plate of the heat conducting member is configured to transmit heat in a planar direction.

According to a fourth aspect of the present invention, in the evaporator with a cool storage function according to one of the first aspect to the third aspect, the base plate of the heat conducting member includes a plurality of through holes, and one of the left-projecting parts and the right-projecting parts is provided integrally with an edge of each of the through holes in the base plate.

According to a fifth aspect of the present invention, in the evaporator with a cool storage function according to the fourth aspect, the through holes of the base plate of the heat conducting member are square, and the left-projecting parts and the right-projecting parts each include two projecting pieces and a contacting piece, the projecting pieces provided integrally with two opposing sides along the edge of the through hole and projecting inside the through hole and obliquely toward a corresponding side wall of the cold storage material container, the contacting piece integrally coupling tip ends of the projecting pieces and in plane-contact with the side wall of the cold storage material container.

According to a sixth aspect of the present invention, in the evaporator with a cool storage function according to the fourth aspect, the through holes of the base plate of the heat conducting member are square, and the left-projecting parts and the right-projecting parts each include a projecting piece and a contacting piece, the projecting piece provided integrally with one side along the edge of the through hole and projecting straight toward a corresponding side wall of the cold storage material container, the contacting piece provided integrally with a tip end of the projecting piece so as to project toward the other side opposing to the one side of the through hole, the contacting piece in plane-contact with the side wall of the cold storage material container.

According to a seventh aspect of the present invention, the evaporator with a cool storage function according to one of the first aspect to the third aspect, the left-projecting parts and the right-projecting parts of the heat conducting member are partially spherical.

According to an eighth aspect of the present invention, in the evaporator with a cool storage function according to one of the first aspect to the seventh aspect, at least part of the left-projecting parts and the right-projecting parts of the heat conducting member are positioned within a full-length in the front-back direction of the refrigerant flow tubes that are adjacent in the right-left direction.

According to a ninth aspect of the present invention, in the evaporator with a cool storage function according to one of the first aspect to the eighth aspect, the cold storage material containers are flat-shaped, in which a longitudinal direction of the cold storage material containers is in the top-bottom direction and a width direction of the cold storage material containers is in the front-back direction, each of the cold storage material containers includes an upper-side wall, a lower-side wall, a front-side wall, and a back-side wall in addition to the left-side wall and the right-side wall, and includes a hollow cold storage material enclosing part surrounded by the side walls, and the heat conducting member is disposed within the cold storage material enclosing part.

According to a tenth aspect of the present invention, in the evaporator with a cool storage function according to the ninth aspect, four coupling parts between each of the upper-side wall and the lower-side wall and each of the front-side wall and the back-side wall of the cold storage material container are arc-shaped, the base plate of the heat conducting member is rectangular, and four corners of the base plate are respectively in contact with the arc-shaped coupling parts.

According to an eleventh aspect of the present invention, in the evaporator with a cool storage function according to the tenth aspect, a front-side peripheral part of the base plate of the heat conducting member is provided with a front-side protruding wall protruding in one of left and right directions, a back-side peripheral part of the base plate of the heat conducting member is provided with a back-side protruding wall protruding in the other of the left and right directions, the front-side protruding wall of the base plate is along an inner surface of the front-side wall of the cold storage material container, and the back-side protruding wall of the base plate is along an inner surface of the back-side wall of the cold storage material container.

According to a twelfth aspect of the present invention, in the evaporator with a cool storage function according to the ninth aspect, the cold storage material container is constituted by two metallic container-constituting plates in which strip-shaped parts along a periphery having a constant width are joined to each other, the cold storage material enclosing part is provided for the cold storage material container by causing a portion excluding the strip-shaped parts that are joined to each other of at least one of the container-constituting plates to expand outward, the base plate of the heat conducting member is rectangular, a protruding part that protrudes outward relative to the cold storage material enclosing part is provided along an entire length of a peripheral part of the base plate, and the protruding part is joined to the strip-shaped parts in a state in which the protruding part is sandwiched between the strip-shaped parts of the container-constituting plates.

According to a thirteenth aspect of the present invention, in the evaporator with a cool storage function according to one of the ninth aspect to the twelfth aspect, the inner surface of each of the left-side wall and the right-side wall of the cold storage material container is provided with a plurality of depressed parts each open in the cold storage material enclosing part and depressed outwardly in the right-left direction, tip ends of at least part of all of the left-projecting parts of the heat conducting member are in contact with portions of the inner surface of the left-side wall of the cold storage material container where the depressed parts are not formed, and tip ends of at least part of all of the right-projecting parts of the heat conducting member are in contact with portions of the inner surface of the right-side wall of the cold storage material container where the depressed parts are not formed.

According to a fourteenth aspect of the present invention, in the evaporator with a cool storage function according to the thirteenth aspect, the base plate of the heat conducting member is provided with a plurality of vertical lines of projecting parts disposed apart from each other in the front-back direction, each of the vertical lines being configured by a plurality of left-projecting parts and a plurality of right-projecting parts disposed at intervals in the top-bottom direction, all of the left-projecting parts and all of the right-projecting parts of each of the vertical lines of projecting parts are disposed at the same position in the front-back direction, and the left-projecting parts and the right-projecting parts are arranged alternately in the top-bottom direction in each of the vertical lines of projecting parts.

According to a fifteenth aspect of the present invention, in the evaporator with a cool storage function according to the fourteenth aspect, out of two vertical lines of projecting parts adjacent in the front-back direction, one of the left-projecting parts and the right-projecting parts of one of the vertical lines of projecting parts and one of the left-projecting parts and the right-projecting parts of the other vertical line of projecting parts are disposed at the same position in the top-bottom direction.

According to a sixteenth aspect of the present invention, in the evaporator with a cool storage function according to the fifteenth aspect, out of two vertical lines of projecting parts adjacent in the front-back direction, the left-projecting parts of one of the vertical lines of projecting parts and the left-projecting parts of the other vertical line of projecting parts are disposed at the same position in the top-bottom direction, and the right-projecting parts of one of the vertical lines of projecting parts and the right-projecting parts of the other vertical line of projecting parts are disposed at the same position in the top-bottom direction.

According to a seventeenth aspect of the present invention, in the evaporator with a cool storage function according to the fourteenth aspect, out of two vertical lines of projecting parts adjacent in the front-back direction, one of the left-projecting parts and the right-projecting parts of one of the vertical lines of projecting parts and one of the left-projecting parts and the right-projecting parts of the other vertical line of projecting parts are disposed at different positions in the top-bottom direction.

According to an eighteenth aspect of the present invention, in the evaporator with a cool storage function according to one of the ninth aspect to the twelfth aspect, all of the left-projecting parts of the heat conducting member include a plurality of types of the left-projecting parts whose projecting heights from the left-side surface of the base plate are different, all of the right-projecting parts of the heat conducting member include a plurality of types of the right-projecting parts whose projecting heights from the right-side surface of the base plate are different, the inner surface of each of the left-side wall and the right-side wall of the cold storage material container is provided with a plurality of depressed parts each open in the cold storage material enclosing part and depressed outwardly in the right-left direction, a plurality of left-projecting parts that are part of all of the left-projecting parts of the heat conducting member are in contact with portions of the inner surface of the left-side wall of the cold storage material container where the depressed parts are not provided, a plurality of left-projecting parts that are part of all of the left-projecting parts are in contact with bottom surfaces of the depressed parts, a plurality of right-projecting parts that are part of all of the right-projecting parts of the heat conducting member are in contact with portions of the inner surface of the right-side wall of the cold storage material container where the depressed parts are not provided, and a plurality of right-projecting parts that are part of all of the right-projecting parts are in contact with bottom surfaces of the depressed parts.

According to a nineteenth aspect of the present invention, in the evaporator with a cool storage function according to the eighteenth aspect, the base plate of the heat conducting member is provided with lateral lines of left-projecting parts including the plurality of left-projecting parts provided at intervals in the front-back direction, and lateral lines of right-projecting parts including the plurality of right-projecting parts provided at intervals in the front-back direction, the lateral lines being arranged at intervals in the top-bottom direction, all of the left-projecting parts of the lateral lines of left-projecting parts and all of the right-projecting parts of the lateral lines of right-projecting parts are at the same position in the top-bottom direction, and the lateral lines of left-projecting parts and the lateral lines of right-projecting parts are adjacent in the top-bottom direction.

According to a twentieth aspect of the present invention, in the evaporator with a cool storage function according to one of the thirteenth aspect to the nineteenth aspect, outer surfaces of the left-side wall and the right-side wall of the cold storage material container are provided with a plurality of condensed water drainage paths having a constant channel length in the top-bottom direction, each of the condensed water drainage paths is provided for the left-side wall and the right-side wall of a container main body of the cold storage material container and expands outward, at least part of an expanding end is provided between two drainage path projecting parts joined to the refrigerant flow tube, and interiors of the drainage path projecting parts constitute the depressed parts in the inner surfaces of the left-side wall and the right-side wall of the cold storage material container.

According to a twenty-first aspect of the present invention, in the evaporator with a cool storage function according to the twentieth aspect, the condensed water drainage path of the left-side wall and the condensed water drainage path of the right-side wall of the cold storage material container are displaced when viewed laterally to a direction along which the refrigerant flow tubes are arranged.

According to a twenty-second aspect of the present invention, in the evaporator with a cool storage function according to the second aspect to the twenty-first aspect, a gap is provided between adjacent tube pairs in the right-left direction by arranging a plurality of tube pairs at intervals in the right-left direction, each of the tube pairs including two refrigerant flow tubes at intervals in the front-back direction, and the cold storage material container and the outer fins are disposed within the gap over two refrigerant flow tubes of the tube pair.

According to the evaporator with a cool storage function of the first aspect to the twenty-second aspect, the heat conducting member is disposed within each of the cold storage material containers, the heat conducting member includes: the base plate distant from the left-side wall and the right-side wall of the corresponding cold storage material container; the plurality of left-projecting parts projecting leftward from the left-side surface of the base plate; and the plurality of right-projecting parts projecting rightward from the right-side surface of the base plate, tip ends of at least the part of all of the left-projecting parts are in contact with the inner surface of the left-side wall of the cold storage material container, and tip ends of at least part of all of the right-projecting parts are in contact with the inner surface of the right-side wall of the cold storage material container. Therefore, when the compressor is working, cold energy of the refrigerant that flows through the refrigerant flow tube is transmitted to the left-side wall and the right-side wall of the cold storage material container, and then to the cold storage material via the left-side wall and the right-side wall. Further, the cold energy transmitted to the left-side wall and the right-side wall of the cold storage material container is transmitted to the cold storage material through the left-projecting parts and the right-projecting parts of the heat conducting member. At the same time, the cold energy transmitted to the left-side wall and the right-side wall of the cold storage material container is transmitted to the base plate through the left-projecting parts and the right-projecting parts of the heat conducting member, and after being transmitted through the base plate in a planar direction, transmitted from the base plate to the cold storage material. On the other hand, when the compressor is not working, the cold energy stored in the cold storage material within the cold storage material container is directly transmitted to the left-side wall and the right-side wall of the cold storage material container, and transmitted through the left-projecting parts and the right-projecting parts of the heat conducting member to the left-side wall and the right-side wall of the cold storage material container. At the same time, the cold energy stored in the portion of the cold storage material within the cold storage material container distant from the left-side and right-side walls of the cold storage material container is transmitted to the base plate of the heat conducting member, and after being transmitted through the base plate in the planar direction, transmitted to the left-projecting parts and the right-projecting parts, and to the left-side and right-side walls of the cold storage material container via the left-projecting parts and the right-projecting parts. The cold energy transmitted to the left-side wall and the right-side wall of the cold storage material container is transmitted through the refrigerant flow tubes to air that flows through an adjacent gap. Therefore, even if the number of the left-projecting parts and the right-projecting parts of the heat conducting member is reduced as compared to the number of the connecting parts of the inner fins of the evaporator with a cool storage function described in Japanese Unexamined Patent Application Publication No. 2014-124971, the cold energy is transmitted through the base plate in the planar direction and to the cold storage material from an entire base plate. Thus, it is possible to prevent reduction of efficiency in receiving and transmitting cold energy to an entire cold storage material within the cold storage material container. As a result, as compared to the offset-shaped inner fins and the corrugated inner fins described in Japanese Unexamined Patent Application Publication No. 2014-124971, it is possible to reduce weight of the heat conducting member, and weight of an entire evaporator with a cool storage function can be reduced.

According to the evaporator with a cool storage function of the fourth aspect to the seventh aspect, the base plate, left-projecting parts, and the right-projecting parts may be provided by press working to a single metallic plate. Therefore, it is possible to reduce a size of a metallic plate used, as compared to a size of a metallic plate used to provide the offset-shaped inner fins and corrugated inner fins described in Japanese Unexamined Patent Application Publication No. 2014-124971. Therefore, as compared to the offset-shaped inner fins and corrugated inner fins described in Japanese Unexamined Patent Application Publication No. 2014-124971, it is possible to reduce weight of the heat conducting member, and weight of an entire evaporator with a cool storage function can be reduced.

According to the evaporator with a cool storage function of the eighth aspect, when the cold storage material is in a liquid phase, a large movement of the cold storage material within the cold storage material container in the front-back direction can be reduced due to an effect of the projecting pieces of the left-projecting parts and the right-projecting parts of the heat conducting member. Therefore, it is possible to reduce generation of abnormal noises due to a large movement of the cold storage material within the cold storage material containers.

According to the evaporator with a cool storage function of the tenth aspect to the twelfth aspect, it is possible to provide superior efficiency in receiving and transmitting cold energy between the refrigerant flow tubes and the left-projecting parts and the right-projecting parts of the heat conducting member through the left-side wall and the right-side wall of the cold storage material container.

According to the evaporator with a cool storage function of the first aspect to the twenty-second aspect, it is possible to ensure positioning of the heat conducting member within the cold storage material enclosing part of the cold storage material container.

The evaporator with a cool storage function according to the first aspect to the twenty-second aspect is preferred in use of a refrigeration cycle that constitutes a car air-conditioner for a vehicle that temporarily stops an engine as a driving source of a compressor when the vehicle stops.

Obviously, numerous modifications and variations of the present invention are possible in light of the above teachings. It is therefore to be understood that within the scope of the appended claims, the invention may be practiced otherwise than as specifically described herein.

What is claimed is:

1. An evaporator with a cool storage function, comprising:
    a first refrigerant flow tube including a first tube wall and a second tube wall opposite to the first tube wall in a thickness direction of the first refrigerant flow tube;
    a second refrigerant flow tube including a third tube wall and a fourth tube wall opposite to the third tube wall in the thickness direction, the first refrigerant flow tube and the second refrigerant flow tube being arranged such that the second tube wall is opposite to the third tube wall in the thickness direction;
    a cold storage material container including a first container wall and a second container wall opposite to the first container wall in the thickness direction, the first container wall and the second container wall defining a cold storage material enclosing space in which a cold storage material is provided, the cold storage material container being provided between the first refrigerant flow tube and the second refrigerant flow tube such that the first container wall contacts the second tube wall of the first refrigerant flow tube and the second container wall contacts the third tube wall of the second refrigerant flow tube; and
    a heat conductor provided in the cold storage material enclosing space, the heat conductor comprising:
        a base plate apart from the first container wall and the second container wall of the cold storage material container;
        first projections projecting from the base plate toward the first container wall to contact the first container wall; and
        second projections projecting from the base plate toward the second container wall to contact the second container wall,
    wherein the base plate of the heat conductor includes through holes, and one of the first projections and the second projections is provided integrally with an edge of each of the through holes in the base plate,
    wherein the through holes of the base plate of the heat conductor are square, wherein the first projections each comprise two first projecting pieces and a first contacting piece, the two first projecting pieces being provided integrally with two opposing sides of an edge of a corresponding first through hole and projecting inside the corresponding first through hole and toward the first container wall of the cold storage material container, the first contacting piece integrally coupling tip ends of the two first projecting pieces and being in plane-contact with the first container wall of the cold storage material container, and wherein the second projections each comprise two second projecting pieces and a second contacting piece, the second projecting pieces being provided integrally with two opposing sides of an edge of a corresponding second through hole and projecting inside the corresponding second through hole and toward the second container wall of the cold storage material container, the second contacting piece integrally coupling tip ends of the second projecting pieces and being in plane-contact with the second container wall of the cold storage material container.

2. The evaporator according to claim 1, wherein the first refrigerant flow tube and the second refrigerant flow tube are flat-shaped, a longitudinal direction of the first refrigerant flow tube corresponds to a top-bottom direction of the evaporator and a width direction of the first refrigerant flow tube corresponds to a front-back direction of the evaporator, and an outer fin is provided so as to be in contact with the first tube wall of the first refrigerant flow tube.

3. The evaporator according to claim 2,
wherein the cold storage material container and the outer fin are provided between a first set of refrigerant flow tubes and a second set of refrigerant flow tubes in the thickness direction, the refrigerant flow tubes of each of the first set and the second set being arranged in the front-back direction, and
wherein the cold storage material container and the outer fin are provided over between the refrigerant flow tubes of the first set and the second set in the front-back direction.

4. The evaporator according to claim 1, wherein the base plate of the heat conductor is configured to transmit heat in a planar direction of the base plate.

5. The evaporator according to claim 1, wherein at least one of the first projections and the second projections of the heat conductor is positioned inside of the first refrigerant flow tube and the second refrigerant flow tube when viewed in the thickness direction.

6. The evaporator according to claim 1,
wherein the cold storage material container is flat-shaped,
wherein a longitudinal direction of the cold storage material container corresponds to a top-bottom direction of the evaporator and a width direction of the cold storage material container corresponds to a front-back direction of the evaporator, and
wherein the cold storage material container includes an upper-side wall, a lower-side wall, a front-side wall, and a back-side wall in addition to the first container wall and the second container wall, and includes the cold storage material enclosing space surrounded by the upper-side wall, the lower-side wall, the front-side wall, the back-side wall, the first container wall, and the second container wall, and the heat conductor is disposed within the cold storage material enclosing space.

7. The evaporator according to claim 6, wherein four coupling parts between each of the upper-side wall and the lower-side wall and each of the front-side wall and the back-side wall of the cold storage material container are arc-shaped, and wherein the base plate of the heat conductor is rectangular, and four corners of the base plate are respectively in contact with the four coupling parts.

8. The evaporator according to claim 6,
wherein the cold storage material container is constituted by two metallic container-constituting plates of which strip-shaped parts along a periphery having a constant width are joined to each other, and
wherein at least one of the two metallic container-constituting plates excluding the strip-shaped parts expands outward to define the cold storage material enclosing space, the base plate of the heat conductor is rectangular, an outer perimeter of the base plate is outside of the cold storage material enclosing space in a planar direction of the base plate, and the outer perimeter of the base plate is joined to the strip-shaped parts in a state in which the outer perimeter is sandwiched between the strip-shaped parts of the two metallic container-constituting plates.

9. The evaporator according to claim 6, wherein an inner surface of each of the first container wall and the second container wall of the cold storage material container is provided with depressed parts each open in the cold storage material enclosing space and depressed outwardly in the thickness direction, tip ends of the first projections of the heat conductor are in contact with the inner surface of the first container wall where the depressed parts are not provided, and tip ends of the second projections of the heat conductor are in contact with the inner surface of the second container wall where the depressed parts are not provided.

10. The evaporator according to claim 9, wherein the first projections and the second projections define vertical lines disposed apart from each other in the front-back direction, the first projections and the second projections in each of the vertical lines are disposed at the same position in the front-back direction, and the first projections and the second projections in each of the vertical lines are arranged alternately in the top-bottom direction.

11. The evaporator according to claim 9,
wherein outer surfaces of the first container wall and the second container wall of the cold storage material container are provided with a condensed water drainage path having a constant channel length in the top-bottom direction,
wherein the condensed water drainage path is provided between two drainage path projecting parts, the two drainage path projecting parts projecting outwardly from a container main body of the cold storage material container such that at least one projecting end of the two drainage path projecting parts is in contact with one of the first refrigerant flow tube and the second refrigerant flow tube, and
wherein interiors of the drainage path projecting parts constitute the depressed parts in the inner surface of one of the first container wall and the second container wall of the cold storage material container, respectively.

12. The evaporator according to claim 11, wherein the condensed water drainage path of the first container wall and the condensed water drainage path of the second container wall are displaced when viewed in the thickness direction.

13. The evaporator according to claim 1,
wherein the two first projecting pieces are provided to project obliquely toward the first container wall of the cold storage material container, and wherein the two second projecting pieces are provided to project obliquely toward the second container wall of the cold storage material container.

\* \* \* \* \*